(12) United States Patent
Dolson et al.

(10) Patent No.: US 7,277,963 B2
(45) Date of Patent: Oct. 2, 2007

(54) TCP PROXY PROVIDING APPLICATION LAYER MODIFICATIONS

(75) Inventors: David Dolson, Waterloo (CA); Matthew Desmond, Kitchener (CA); Jim Kuhn, Waterloo (CA)

(73) Assignee: Sandvine Incorporated, Waterloo (CA)

( * ) Notice: Subject to any disclaimer, the term of this patent is extended or adjusted under 35 U.S.C. 154(b) by 624 days.

(21) Appl. No.: 10/179,168

(22) Filed: Jun. 26, 2002

(65) Prior Publication Data

US 2004/0006643 A1    Jan. 8, 2004

(51) Int. Cl.
*G06F 15/16* (2006.01)
(52) U.S. Cl. .............. 709/246; 709/203; 709/230; 709/231; 709/232; 709/247
(58) Field of Classification Search .......... 709/203, 709/230–232, 246–247, 236
See application file for complete search history.

(56) References Cited

U.S. PATENT DOCUMENTS

| | | | | |
|---|---|---|---|---|
| 5,574,919 | A * | 11/1996 | Netravali et al. | 712/220 |
| 5,680,552 | A * | 10/1997 | Netravali et al. | 709/250 |
| 5,826,017 | A * | 10/1998 | Holzmann | 709/230 |
| 6,006,268 | A * | 12/1999 | Coile et al. | 709/227 |
| 6,018,530 | A * | 1/2000 | Chakravorty | 370/471 |
| 6,111,893 | A * | 8/2000 | Volftsun et al. | 370/466 |
| 6,134,598 | A * | 10/2000 | Raman | 709/246 |
| 6,247,048 | B1 * | 6/2001 | Greer et al. | 709/219 |
| 6,298,041 | B1 | 10/2001 | Packer | |
| 6,356,950 | B1 * | 3/2002 | Tillmann et al. | 709/246 |
| 6,401,132 | B1 * | 6/2002 | Bellwood et al. | 709/246 |
| 6,481,621 | B1 * | 11/2002 | Herrendoerfer et al. | 235/380 |
| 6,611,876 | B1 * | 8/2003 | Barrett et al. | 709/246 |
| 6,665,725 | B1 * | 12/2003 | Dietz et al. | 709/230 |
| 6,684,257 | B1 * | 1/2004 | Camut et al. | 709/246 |
| 6,725,424 | B1 * | 4/2004 | Schwerdtfeger et al. | 715/513 |
| 6,742,043 | B1 * | 5/2004 | Moussa et al. | 709/232 |
| 6,766,375 | B2 * | 7/2004 | Hadland | 709/230 |
| 6,785,730 | B1 * | 8/2004 | Taylor | 709/230 |
| 6,870,817 | B2 * | 3/2005 | Dolinar et al. | 370/252 |
| 6,886,166 | B2 * | 4/2005 | Harrison et al. | 719/313 |
| 2002/0032798 | A1 * | 3/2002 | Xu | 709/238 |
| 2002/0038339 | A1 * | 3/2002 | Xu | 709/203 |
| 2002/0062342 | A1 * | 5/2002 | Sidles | 709/203 |
| 2002/0161907 | A1 * | 10/2002 | Moon | 709/230 |
| 2002/0165986 | A1 * | 11/2002 | Tarnoff | 709/246 |

FOREIGN PATENT DOCUMENTS

WO    WO 01/65805 A2    9/2001

OTHER PUBLICATIONS

A. Tanenbaum:Computer Networks 3rd Edition 1996—Prentice Hall, New Jersey XP002262500, p. 219.
J. Border et al: Performance Enhancing Proxies Intended to Mitigate Link-Related Degradation RFC 3135, Jun. 2001 XP002262499.
Balakrishnan H et al Improving TCP/IP Performance Over Wireless Networks: Mobicom. Proceedings of the Annual International Conference on Mobile Computing and Networking , Nov. 1995, XP002920962.

* cited by examiner

*Primary Examiner*—Zarni Maung
*Assistant Examiner*—Saket K. Daftuar
(74) *Attorney, Agent, or Firm*—Neil Henderson

(57) ABSTRACT

The invention disclosed is a Transmission Control Protocol (TCP) transport handler for a network intermediary. The handler examines all segments in a TCP/IP data stream between two nodes The handler maintains a list of changes made by an application module to a data segment within a data stream and utilizes that list to ensure that the sequence numbers for both receiver and transmitter refer to the same segments of data. The list of changes is also used to reapply changes to retransmitted packets. Data segments are not acknowledged until the receiver acknowledges a segment, eliminating the requirement of buffering data segments.

30 Claims, 14 Drawing Sheets

TCP PROXY PROVIDING APPLICATION LAYER MODIFICATIONS

FIELD OF THE INVENTION

The present invention relates to a system and method for transparently inspecting and modifying a TCP stream.

BACKGROUND OF THE INVENTION

One of the most common methods of transferring a data stream within the Internet is TCP/IP. TCP being Transmission Control Protocol and IP being Internet Protocol. Some examples of a data stream are: an email message, a file transfer or streaming video. Data streams are broken into packets. Each packet contains a portion of data to be transmitted from one computer or "node", to another. TCP/IP allows a data stream to be split into packets.

IP is unreliable in the sense that packets may be lost or shuffled and there is no positive or negative confirmation of receipt. However, when combined with TCP, TCP/IP reliably transfers data between two nodes in correct sequence. A single TCP/IP session allows bidirectional data streams to be sent between nodes. Once initiated, communication is symmetrical between the two nodes as each node acts in both sender and receiver roles simultaneously.

Thus, TCP/IP is a two layer program. The higher layer, Transmission Control Protocol, manages the assembling of a data stream into smaller packets that are transmitted over the Internet and received by a TCP layer that reassembles the packets into the original message. The lower layer, Internet Protocol, handles the address part of each packet so that it gets to the right destination.

Bytes in a TCP/IP data stream are consecutively numbered with a 32 bit number known as a sequence number. This allows the receiver to identify duplicate or missing data. The sender knows that all data prior to a given sequence number has been received when the sender gets an acknowledgement (ACK) for the sequence number. For each connection the sequence number begins at a random value as chosen arbitrarily by a sender. A synchronization (SYN) packet identifies the initial value.

Often one node in a TCP/IP connection may be on the Internet and a second node may be within a protected network such as corporate network or a network managed by an Internet Service Provider (ISP). In order to ensure that unwanted data does not enter nor leave a protected network, a proxy is typically installed between the Internet and the protected network to examine packets transmitted by both sides. Thus, a proxy acts as a peer to both computers it communicates with. It accepts a connection to each of the two nodes and passes data between the two connections.

A proxy also acts as a gatekeeper. A proxy may utilize many methods to determine if a packet may pass, such as:
   a) filtering unwanted packets, i.e. those from undesired sources;
   b) translating addresses of the packets, to ensure they are sent to a desired recipient;
   c) scanning for correct format;
   d) determining if a packet contains unwanted material, such as a virus; and;
   e) preventing incoming connections to protected nodes.

The processing of multiple connections that each require a proxy is computationally expensive. Further, all unacknowledged data travelling in each direction must be kept in memory; this may result in the buffering of substantial amounts of data, particularly when receiving data from a fast connection. Finally, timers must be used to trigger retransmission of data, which hasn't been acknowledged by the receiving node. Thus, there is a need for a proxy that can modify data, minimize the buffering of data and limit the requirement of timers for each session. The present invention addresses this need.

SUMMARY OF THE INVENTION

The present invention relates to a TCP proxy.

One aspect of the present invention is a TCP proxy, the proxy operatively connected to one or more pairs of nodes, the proxy accepting as input, data streams from the nodes, the proxy providing as output, modifications of the data streams, the modifications determined by analysis of the data streams.

In another aspect of the present invention, there is provided a computer readable medium containing computer instructions for implementing a TCP proxy.

In another aspect of the present invention, there is provided a method for examining segments in a data stream, the method comprising the step of determining if a segment has been retransmitted and applying modifications to the segment before forwarding the segment.

In another aspect of the present invention, there is provided a method for modifying segments in a data stream having the steps of:
a) examining each of the segments to determine if a segment requires modification; and
b) if a segment is to be modified, generating modification tags for the segment.

In another aspect of the present invention, there is provided a method for recording modifications in segments in a data stream, the method comprising the step of recording each modification in a segment as a change point, for the purpose of mapping sequence numbers to modified sequence numbers and vice versa.

In yet another aspect of the present invention, there is provided a method for managing segments in a TCP window, the method comprising the step of determining if a portion of the received segment is within the window and applying any applicable modification tags to the received segment and forwarding the received segment.

BRIEF DESCRIPTION OF THE DRAWINGS

For a better understanding of the present invention, and to show more clearly how it can be carried into effect, reference will now be made, by way of example only, to the accompanying drawings in which.

DETAILED DESCRIPTION OF THE INVENTION

It is not the intent of this disclosure to provide a detailed description of the TCP/IP architecture. A complete description of the TCP architecture is available in the Internet Engineering Task Force (IETF) Request for Comments (RFC) document, IETF RFC 793. Similarly, IP is defined in RFC 791. Other RFCs to which the present invention applies are: RFC 813—Window and Acknowledgement Strategy in TCP, RFC 1122—Requirements for Internet Hosts—Communication Layers, RFC 1323—TCP Extensions for High Performance, RFC 2018—TCP Selective Acknowledgement Options, and RFC 2581—TCP Congestion Control.

Figure 1:
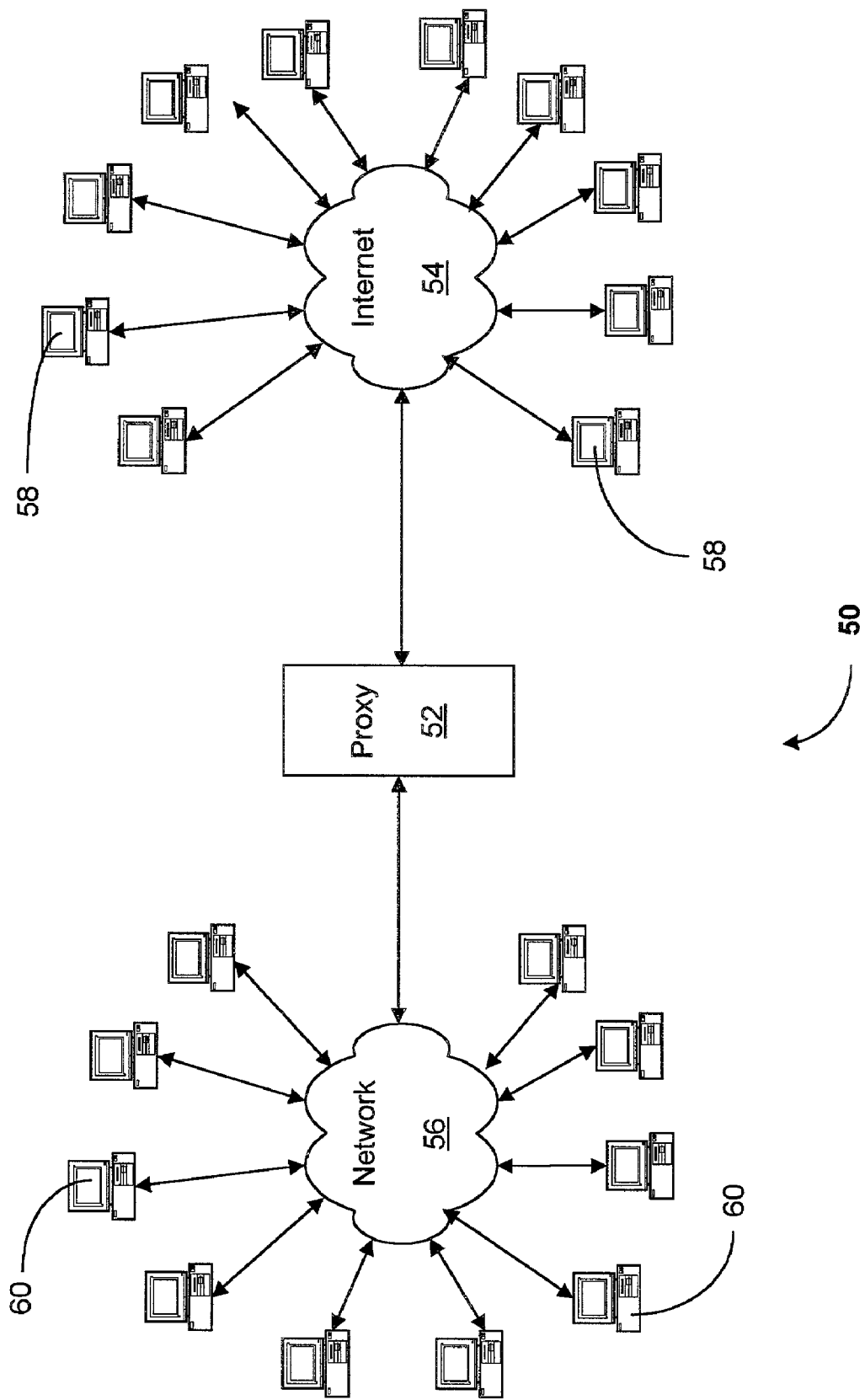
FIG. 1 is a block diagram of a system utilizing the present invention.

Referring first to FIG. 1, a block diagram of a system utilizing the present invention is shown generally as 50. System 50 comprises proxy 52 in which the present invention resides. Proxy 52 serves to connect nodes 58 on Internet 54 with nodes 60 on network 56. Network 54 is shown to be the Internet, but may be any network supporting TCP/IP communications. Also, proxy 52 may receive communications from a plurality of other networks, it is not restricted to only two networks as illustrated in FIG. 1.

Figure 2:
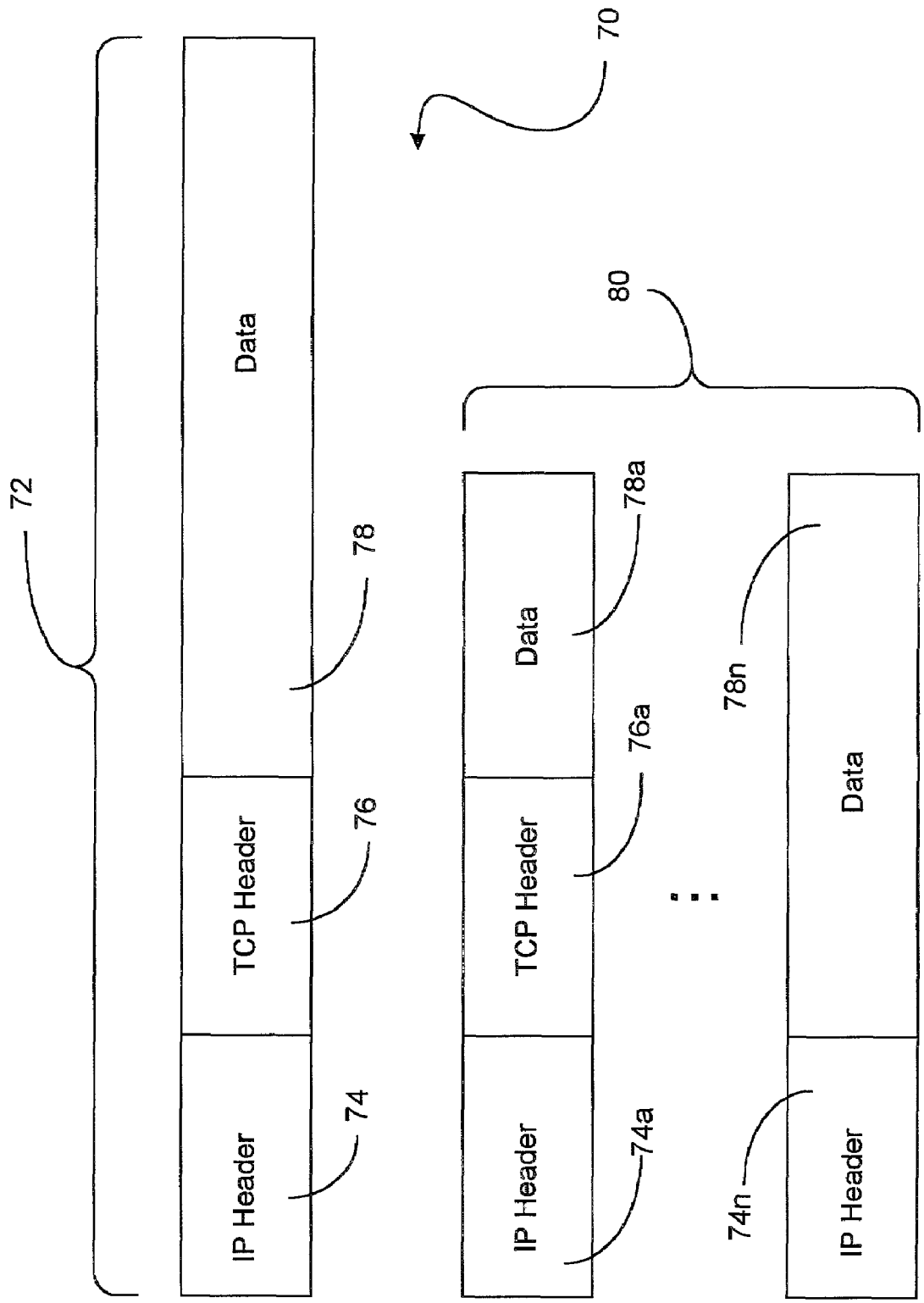
FIG. 2 a block diagram of two forms of segments.

It is not the intent of this disclosure to describe in detail the structure and content of a TCP/IP packet as such details are readily available in the IETF documents mentioned earlier. However, a brief overview may be helpful to the reader. Referring now to FIG. 2 a block diagram of two forms of segments is shown generally as 70.

In this disclosure and the claims, the inventors refer to feature 72 as a "segment". Segment 72 comprises an IP header 74, a TCP header 76 and a data portion 78. Due to network communication restrictions on the size of a segment, segment 72 may be fragmented as shown by way of example with reference to block 80. In the example shown, block 80 comprises a plurality of segment fragments, the first of which comprises an IP header 74a, a TCP header 76a and a portion of data 78, shown as 78a. Subsequent fragments comprise IP header 74n and data 78n. Block 80 is simply a reformation of segment 72 and it is the intent of the inventors that any reformation of a segment 72 is to be logically viewed as a segment.

Within TCP header 76, eight control bits may be utilized to control communications. Three letter abbreviations of these control bits, used by the present invention, hereinafter referred to as "flags" and a brief description are illustrated in Table 1. We provide this table to aid the reader in understanding the basic communication of TCP and how the present invention handles the flags of Table 1.

TABLE 1

| Flag | Function |
| --- | --- |
| URG | Urgent |
| ACK | Acknowledgement |
| RST | Reset |
| SYN | Synchronize sequence number |
| FIN | No more data from sender, i.e. end of the data stream |

Figure 3:
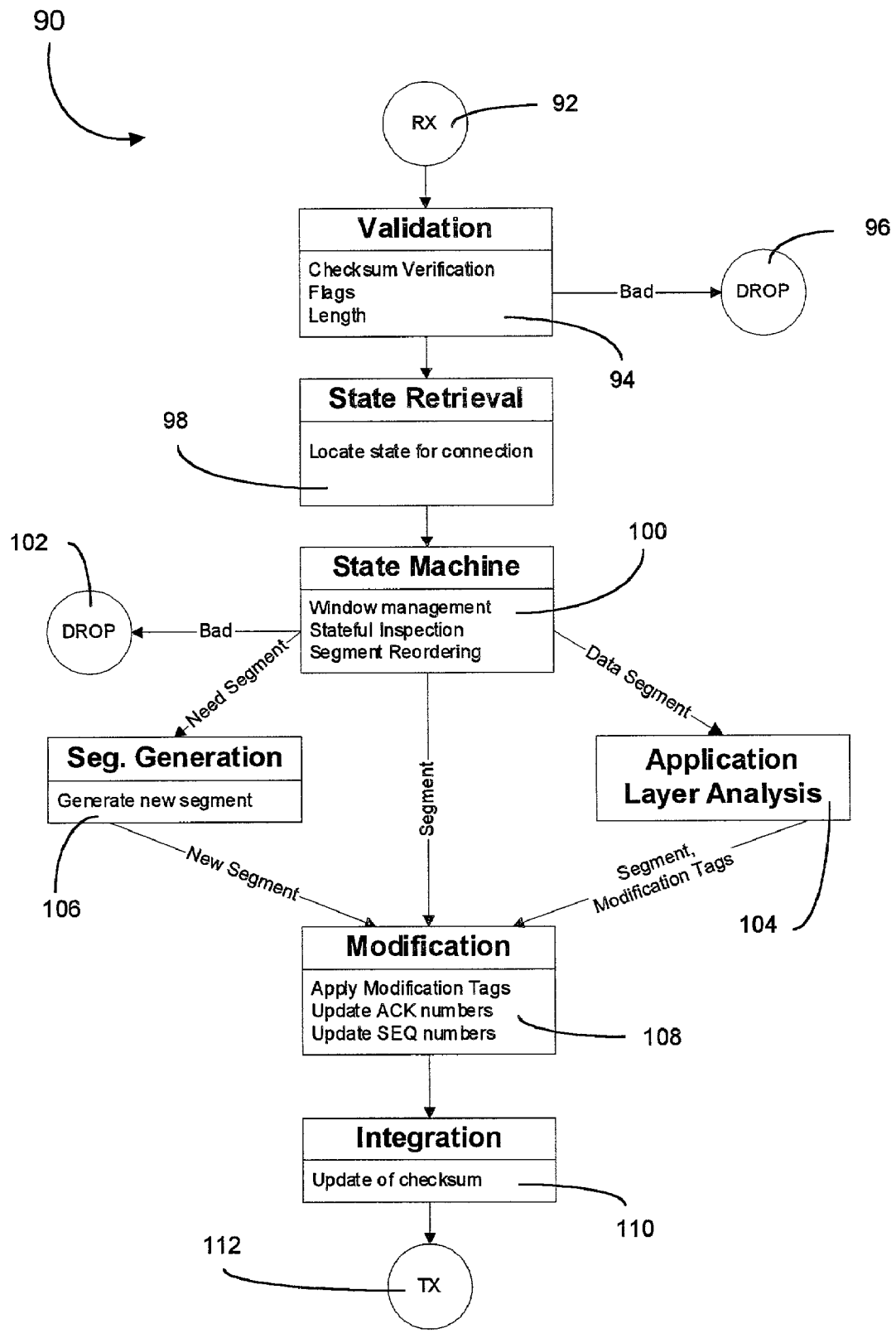
FIG. 3 is a block diagram of the processing modules of the present invention.

Referring now to FIG. 3 a block diagram of the processing modules of the present invention is shown generally as TCP handler 90. TCP handler 90 receives a TCP/IP segment at receiver module 92 (Rx). Validation module 94 examines the segment to check the validity of the segment. Such tests include, but are not limited to:
a) checking invalid flag combinations as only certain combinations of SYN, ACK, RST and FIN make sense, specifically: SYN, SYN+ACK, ACK, ACK+FIN, RST, and ACK+RST
b) verifying the that both the TCP and IP checksum for a segment is correct; and
c) checking for invalid length; if a segment length is shorter than what is described in the TCP or IP header, the segment will be dropped.

If a segment fails any of the tests of module 94 it will be immediately dropped as shown at module 96.

State retrieval module 98 uniquely associates an incoming segment with a connection by utilizing:
a) the source address of the segment;
b) source port number of the segment;
c) the destination address of the segment;
d) destination port number of the segment; and
e) the direction of the segment TCP handler 90 may optionally include a normalization module (not shown) which would logically follow state retrieval module 98. A normalization module would modify segments to remove ambiguities. For example:
a) removing Maximum Segment Size (MSS) information from non (SYN) segments;
b) removing the Window Scale Option (WSOPT) from non SYN segments;
c) removing Selective Acknowledgement (e.g. SACK-permitted) information from non SYN segments;
d) removing fields or data that is not supported by the TCP standard; and
e) removing extra data after the IP packet in the segment.

State machine 100 handles:
a) identification of data within a segment, that has not yet been seen and needs to be presented to application layer analysis 104;
b) segment reordering to ensure segments are presented to application layer analysis 104 in the correct sequence;
c) identification of duplicate data that has already been seen by application layer analysis 104;
d) TCP window state updates (see description of FIG. 13);
e) TCP window size adjustments;
f) stateful filtering; for example, not forwarding data from segments that are too old or too far in the future;
g) protocol startup;
h) protocol shutdown;
i) exception handling;
j) identifying redundant segments to save bandwidth; and
k) identifying illegal segments, which may form an attack.

State machine 100 is data driven. State transitions and decisions are made only when new segments arrive. Segments may be dropped at step 102 if they are determined to be redundant or illegal as described above in features j) and k).

Application layer analysis 104 comprises one or more application handlers. It is the intent of the inventors that any application handler that utilizes the TCP/IP protocol may reside in application layer analysis 104. In order to ensure this, the present invention provides an interface that ensures a properly reconstructed stream of segments (i.e. no holes or duplications) is delivered to application layer analysis module 104. When state machine 100 identifies data that has not been processed by application layer analysis module 104, module 104 is invoked and passed the following information:

a) pointer to and length of new data;
b) the unique identifier for the two way connection between two nodes, for example a server and a client; and
c) the direction of the data, i.e. which half of the connection it applies to.

Application handler layer analysis module 104 accepts the new data and returns one of the following actions:

a) approval of the new data without modification;
b) a list of modifications to the new data, including deleting, inserting or replacing a range of data; or
c) a request to terminate the two way connection.

Application handler layer analysis 104 may modify data in a number of situations, a first example addresses content filtering or censoring, it may:

1) remove the names of undesirable newsgroups within a Network News Transfer Protocol (NNTP) data stream. Each newsgroup name is compared against a database of names or a regular expression filter and if a match occurs, the name of the newsgroup is deleted from the TCP stream.

2) modify an attempt to access an undesirable web page by causing the requested web page to be replaced with a redirect-message or a notice that filtering has occurred. A requested URL is compared against a database and if a match occurs then either a) the TCP stream can be modified to replace the URL with the URL of a notice that filtering occurred; or
b) the TCP stream can be modified to replace the data, which is returned from the filtered site with a filtering notice.

In a second example, an anti-virus module can prevent the transfer of a virus. As a file is being downloaded, either the entire file or the last portions of the file can be held back until virus checking passes.

In a third example, a network address translation (NAT) module maps private IP addresses used by nodes behind a firewall onto global IP addresses. This requires mapping IP addresses and ports as well as modifying the contents of TCP streams for some protocols. For FTP (file transfer protocol), a user-readable address such as "10.2.2.2" might need to be replaced with a longer one such as "101.202.202.202".

Once application layer analysis 104 has allowed data to pass, the data cannot be modified retroactively.

In the event that application layer analysis 104 cannot immediately return a verdict, it can delete data and remember to insert it later. For example, an anti-virus module could always delete the most-recently-received segment and insert the segment, which was deleted last time. In this way, a data stream will not be completely received until a slower anti-virus processing thread has approved it.

Application layer analysis 104 will examine the new data and possibly provide a set of modification tags that describe the transformation requested. Three modification-tag operations are supported:

a) Insertion, a set of bytes is inserted at a point in a stream;
b) Deletion, a range of bytes is removed from the stream; and
c) Replacement, a range of bytes is replaced by a new range of bytes of the same length.

Application layer analysis 104 is presented with bytes from one segment at a time, and as such the modifications are associated with a segment. After receipt from the application layer analysis 104, modifications may be applied to a segment.

Modifications are also mapped to original sequence numbers and stored so that they may be applied to retransmitted segments, as application layer analysis 104 does not receive retransmitted segments.

If a segment contains partially retransmitted data and partially new data, application layer analysis 104 will only be given the new data. The previously seen data will have any stored modifications applied to it.

State machine 100 will on occasion need to generate segments, for example when:

a) sending ACK segments to the sender to force the sender's rapid re-transmit algorithm to activate;
b) sending ACK segments to the sender when entire segments are deleted by application layer analysis module 104; and
c) sending RST segments in both directions when the flow is forcibly terminated by application layer analysis module 104.

This generation of segments is handled by segment generation module 106.

Modification module 108 transforms an input segment into an output segment by applying all modification tags returned from application layer analysis module 104 that fall within or partially within the range of sequence numbers of the input segment. Modification tags are stored for as long as the sequence ranges they affect are still in the TCP window, this allows retransmitted segments to have the correct modifications performed upon them. A discussion of a TCP window is provided later with reference to FIG. 13.

The insertion of bytes into a segment could cause the segment to get larger than the maximum allowed segment size. This will require the creation of a second segment in order to transmit the required data. Deletion and replacement of bytes do not cause new segments to be created.

If application layer analysis 104 should indicate the removal of an entire segment, an ACK for that segment will be sent back to the sender to avoid stalling the sender, as the receiving end will never be able to ACK the original dropped segment as it will never see it.

The insertion and deletion of bytes from the overall data stream causes the sequence numbers to be different on the sender and receiver sides of the connection. The sender generates the original data stream and provides original sequence numbers while the receiver only sees the modified stream and will thus use modified sequence numbers. TCP handler 90 must take the numbers provided in ACKS from the receiver and convert them back to numbers understood by the sender. In the case of insertion, a single original sequence number will map to a range of modified numbers. In the case of deletion, a range of original sequence numbers will map to a single modified number. The present invention needs only to consider remapping ACKs that are in the TCP window. Since modification tags for the window are saved, all the necessary information is available.

Integration module 110 has the task of ensuring that segments are prepared for transmission. In the cases where a segment is simply being forwarded (no modifications made) module 110 does nothing except to forward the segment to transmission module 112 (Tx). In cases where a segment is modified, module 110 computes correct checksums.

An IP checksum will need to be modified/corrected if any of the IPheader contents or the length of the segment changes. In other situations, for example, when a segment is fragmented, changes in segment sizes and offsets will require new IP checksums to be generated.

Figure 4:
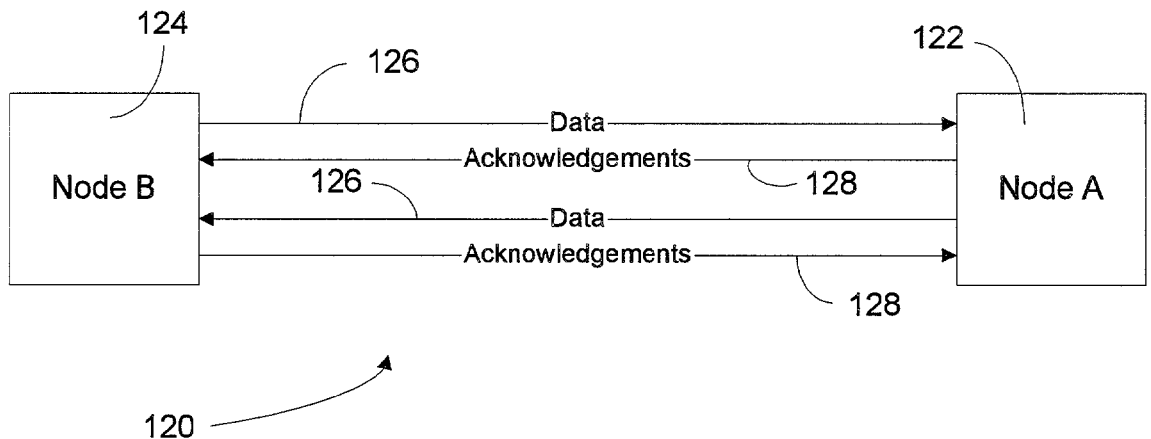
FIG. 4 is a block diagram illustrating the direction of communications between two nodes.

A TCP checksum may be generated in three parts, namely: the TCP header, the TCP pseudo-header and the payload. The TCP header checksum will need recalculation if any part of the TCP header changes. The pseudo-header checksum will need recalculation if the length of the segment changes. The data checksum will need recalculation if the data within the segment changes A connection between two nodes may be thought of as comprising two halves. For each half of the connection there is a sense of forward and reverse. Data travels in the forward direction and acknowledgements travel in the reverse direction. FIG. 4 illustrates this concept.

Referring now to FIG. 4 a block diagram illustrating the direction of communications between two nodes, in this case Node A 122 and Node B 124, is shown generally as 120. From the perspective of both nodes 122 and 124 they each send data 126 in a forward direction and receive acknowledgements 128 to that data in a reverse direction Referring now to FIG. 5 a block diagram illustrating the direction of communications between two state machines is shown generally as 130. Both Node A state machine 132 and Node B state machine 134 are instances of a state machine 100 as shown in FIG. 3. Data 136 flows from each node to its respective state machine. Acknowledgements 138 flow from each node to the state machine representing the other half of the connection. In other words acknowledgements 138 from node B are sent to the state machine for Node A, 132 and vice versa. Acknowledgements 138 are also transmitted directly between state machines 132 and 134 to ensure that each is aware of the segments received. Both data and acknowledgements 140 from one node are forwarded directly to the other node via a state machine.

In order for state machines 132 and 134 to determine what data has been received by nodes 122 and 124, they receive acknowledgements 138. For example, state machine 132 passes data to Node B 124. Node B 124 responds with acknowledgements 138, which permit state machine 132 to determine the status of the segments transmitted to Node B 124.

Figure 6:
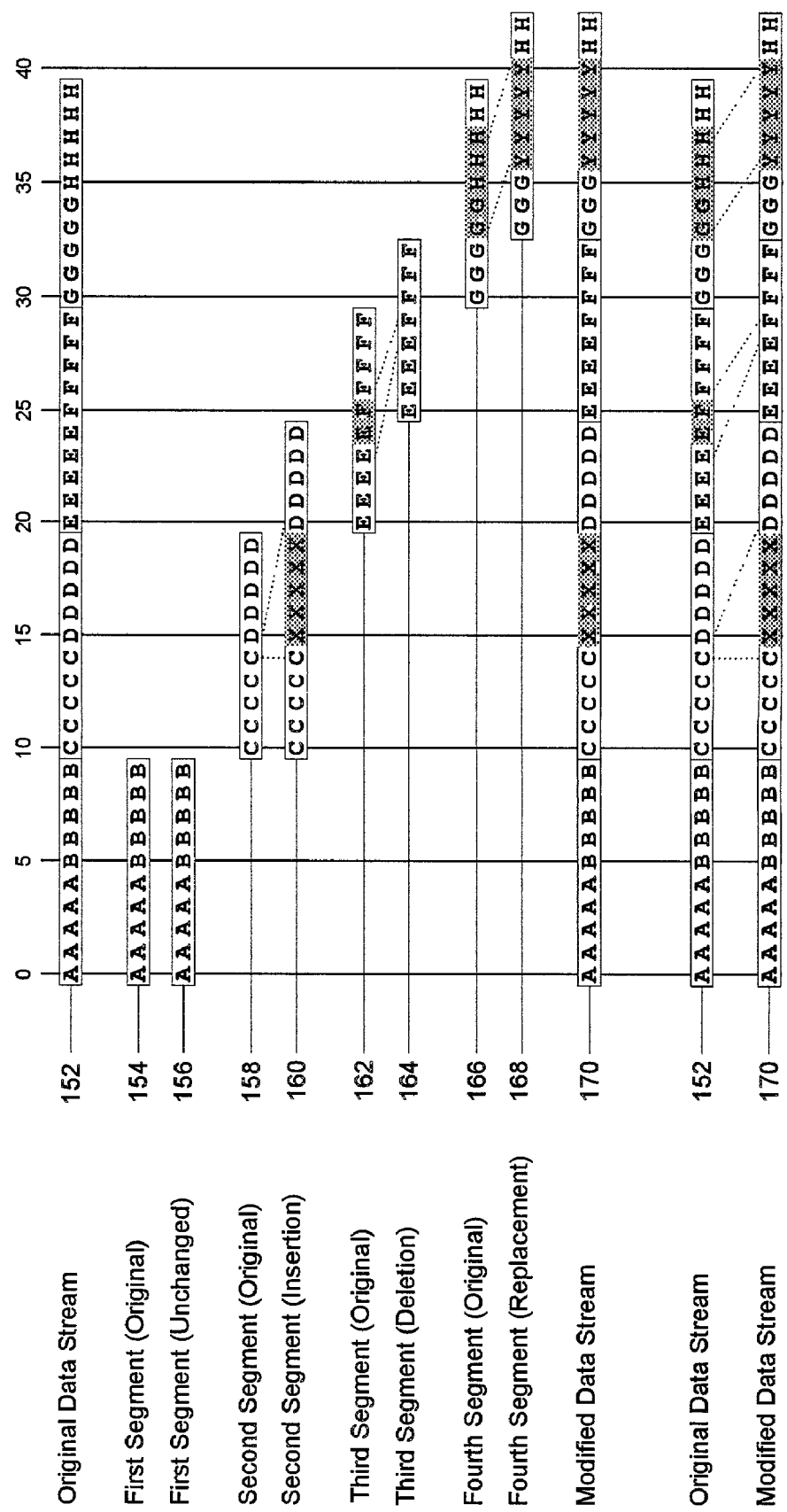
FIG. 6 is an example of modifications to a data stream.

Referring now to FIG. 6 an example of modifications to a data stream is shown generally as 150. FIG. 6 illustrates a simple example of a modified TCP session. One node generates no TCP data, while the other node sends the data stream 152 Application layer analysis module 104 (see FIG. 3) chooses to modify data stream 152 to create data stream 170.

Modifications are always made relative to the original data stream 152. The modifications illustrated in FIG. 6 are:
a) insertion of "XXXXX" at position 15
b) deletion of "EF" at position 24
c) replacement of "GGHHH" with "YYYYY" at position 33.

For the purposes of this example, we shall assume that the node sending the data stream is sending four segments, each comprising ten bytes. The four original segments are shown as 154, 158, 162 and 166 respectively. The modified segments are shown as 160, 164 and 168 respectively. First segment 154 does not change as is shown by segment 156.

Table 2 shows the forward (sequence number) and reverse (ACK) mappings for data stream 152. The "Mapping to Modified" column indicates the operation performed. An offset is indicated with +/−N, an absolute value is indicated with =N.

TABLE 2

| Original Sequence Number | Original Data | Mapping to Modified | Modified Data | Modified Sequence Number | Mapping to Original |
|---|---|---|---|---|---|
| 0 | A | +0 | A | 0 | +0 |
| 1 | A | +0 | A | 1 | +0 |
| 2 | A | +0 | A | 2 | +0 |
| 3 | A | +0 | A | 3 | +0 |
| 4 | A | +0 | A | 4 | +0 |
| 5 | B | +0 | B | 5 | +0 |
| 6 | B | +0 | B | 6 | +0 |
| 7 | B | +0 | B | 7 | +0 |
| 8 | B | +0 | B | 8 | +0 |
| 9 | B | +0 | B | 9 | +0 |
| 10 | C | +0 | C | 10 | +0 |
| 11 | C | +0 | C | 11 | +0 |
| 12 | C | +0 | C | 12 | +0 |
| 13 | C | +0 | C | 13 | +0 |
| 14 | C | +0 | C | 14 | +0 |
|  |  |  | X | 15 | =14 |
|  |  |  | X | 16 | =14 |
|  |  |  | X | 17 | =14 |
|  |  |  | X | 18 | =14 |
|  |  |  | X | 19 | =14 |
| 15 | D | +5 | D | 20 | −5 |
| 16 | D | +5 | D | 21 | −5 |
| 17 | D | +5 | D | 22 | −5 |
| 18 | D | +5 | D | 23 | −5 |
| 19 | D | +5 | D | 24 | −5 |
| 20 | E | +5 | E | 25 | −5 |
| 21 | E | +5 | E | 26 | −5 |
| 22 | E | +5 | E | 27 | −5 |
| 23 | E | +5 | E | 28 | −5 |
| 24 | E | =29 |  |  |  |
| 25 | F | =29 |  |  |  |
| 26 | F | +3 | F | 29 | −3 |
| 27 | F | +3 | F | 30 | −3 |
| 28 | F | +3 | F | 31 | −3 |
| 29 | F | +3 | F | 32 | −3 |
| 30 | G | +3 | G | 33 | −3 |
| 31 | G | +3 | G | 34 | −3 |
| 32 | G | +3 | G | 35 | −3 |
| 33 | G | +3 | Y | 36 | −3 |
| 34 | G | +3 | Y | 37 | −3 |
| 35 | H | +3 | Y | 38 | −3 |
| 36 | H | +3 | Y | 39 | −3 |
| 37 | H | +3 | Y | 40 | −3 |
| 38 | H | +3 | H | 41 | −3 |
| 39 | H | +3 | H | 42 | −3 |

Table 2 illustrates the following with regard to sequence number mapping:
a) the initial operation for both forward and reverse mappings is to add 0;
b) once a change point for a mapping is established, it remains uniform until the next change point;
c) the insert operation at byte 15 causes:
  i) a change point at position 15 for forward mapping; and
  ii) change point at positions 15 and 20 for reverse mapping;
d) the delete operation at byte 24 causes:
  i) a change point at positions 24 and 26 for forward mapping; and
  ii) a change point at position 29 for reverse mapping;
e) the modify operation at byte 33 results in null change points.

Figure 7:
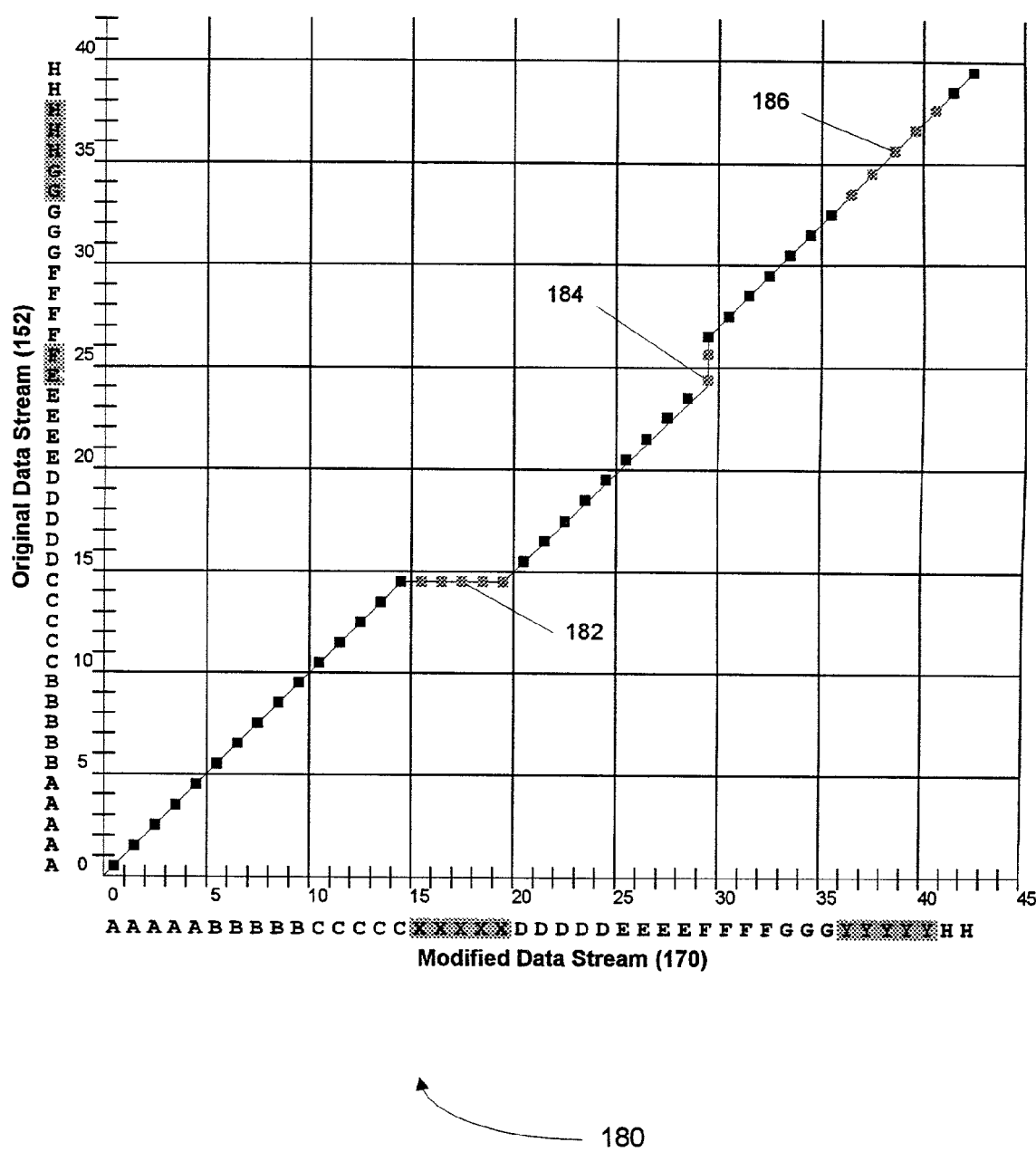
FIG. 7 is a graph of original vs. modified sequence numbers.

The content of Table 2 may also be shown as a graph as illustrated in FIG. 7. FIG. 7 is a graph of original vs. modified sequence numbers; the graph is shown generally as 180. Graph 180 has as its vertical axis the bytes of original data stream 152. The horizontal axis corresponds to the bytes of modified data stream 170. First modification modification 184 indicates the deletion of two bytes at position 24. Third modification 186 indicates the replacement of five bytes at position 33.

To use graph 180 to map an original sequence number to a modified sequence number, first find the number along the vertical axis and follow right to where it intersects the plotted line. Then follow the intersection down to retrieve the modified number. If the intersection happens to be horizontal, then the left most (lowest) number should be used.

To use graph 180 to map a modified sequence number to the original, first find the number along the horizontal axis and follow up to where it intersects the plotted line. Then follow the intersection left to retrieve the original number. If the intersection happens to be vertical, then the highest number should be used.

Retaining a byte-for-byte mapping table, such as table 2, in memory, if for only the active TCP window (See FIG. 13 for a description of a TCP window) would be impractical. Instead, a change point table of significant sequence numbers (change points) is generated. Entries in the change point table need only exist while the sequence number ranges they represent are still in the TCP window.

Mappings are performed in the forward direction and in the reverse direction. As discussed earlier, the forward direction indicates data, which contain sequence numbers The reverse direction applies to acknowledgements. The information for the two mappings is directly related, but not identical, and is stored together. A change point contains the information described in the following Table 3.

TABLE 3

| Change Point Field | Definition |
| --- | --- |
| Forward Sequence | The lowest sequence number affected by this change. |
| Forward Operation | The sequence mapping operation performed (offset, absolute or null) |
| Value | The sequence number offset to be added or the absolute sequence number to be used in the mapping. |
| Reverse Sequence | The lowest ACK number affected by this change. |
| Reverse Operation | The ACK mapping operation performed (offset, absolute or null) |
| Modification | A link to the modified data so that the insert or replacement data can be located. |

There are three types of operation, be they forward or reverse:
  a) Offset: The associated 'Value' is added to (forward) or subtracted from (reverse) the original sequence number or ack to find the new value.
  b) Absolute: The associated 'Value' is used as the new value.
  c) Null: No operation is performed.

Each modification generates a pair of change points. The change points generated for each type of modification are shown in Table 4.

TABLE 4

| Modification | Change Point 1 (Fwd) | Change Point1 (Rev) | Change Point 2 (Fwd) | Change Point 2 (Rev) |
| --- | --- | --- | --- | --- |
| Insert | Null | Absolute | Offset | Offset |
| Delete | Absolute | Null | Offset | Offset |
| Replace | Offset | Offset | Offset | Offset |

Several important values are retained concerning the state of the change point table namely:

initialOffset the starting offset number, the start value is 0.
lastOffset the most recent offset number calculated, the start value is 0.
lowestForward the lowest forward sequence number affected by the table
highestForward the highest forward sequence number affected by the table
lowestReverse the lowest reverse sequence number (ACK) affected by the table
highestReverse the highest reverse sequence number (ACK) affected by the table The calculation of values for the change points is as follows, where sequence_number is the sequence number of the operation
insertion_length is the length of the insertion
deletion_length is the length of the deletion; and
replacement_length is the length of the replacement In the case of insertion:

newOffset=lastOffset+insertion_length changepoint1.forwardSequence=sequence_number changepoint1.forwardOperation=Null changepoint1.reverseSequence=sequence_number+lastOffset changepoint1.reverseOperation=Absolute changepoint1.value=sequence_number−1 changepoint2.forwardSequence=sequence_number changepoint2.forwardOperation=Offset changepoint2.reverseSequence=sequence_number+newOffset changepoint2.reverseOperation=Offset changepoint2.value=newOffset lastOffset=newOffset In the case of deletion:

newOffset=lastOffset−deletion_length changepoint1.forwardSequence=sequence_number changepoint1.forwardOperation=Absolute changepoint1.reverseSequence=sequence_number+lastOffset changepoint1.reverseOperation=Null changepoint1.value=sequence_number+lastOffset changepoint2.forwardSequence=sequence_number+deletion_length changepoint2.forwardOperation=Offset changepoint2.reverseSequence=sequence_number+lastOffset changepoint2.reverseOperation=Offset changepoint2.value=newOffset lastOffset=newOffset In the case of replacement:

end=sequence_number+replacement_length changepoint1.forwardSequence=sequence_number changepoint1.forwardOperation=Offset changepoint1.reverseSequence=sequence_number+
 lastOffset changepoint1.reverseOperation=Offset changepoint1.value=lastOffset changepoint2.forwardSequence=end changepoint2.forwardOperation=Offset changepoint2.reverseSequence=end+lastOffset changepoint2.reverseOperation=Offset changepoint2.value=lastOffset For the example of FIG. 6, we will now show the updates to the change point table. We begin with Table 5, which illustrates the insertion of five bytes at position 15.

TABLE 5

| Forward Sequence | Forward Operation | Value | Reverse Sequence | Reverse Operation | Modifications |
|---|---|---|---|---|---|
| 15 | Null | [15 − 1] 14 | [15 + 0] 15 | Absolute | Insert 5 at 15 |
| 15 | Offset | [0 + 5] 5 | [15 + 5] 20 | Offset | Insert 5 at 15 |

Table 6 illustrates the deletion of two bytes at position 24.

TABLE 6

| Forward Sequence | Forward Operation | Value | Reverse Sequence | Reverse Operation | Modifications |
|---|---|---|---|---|---|
| 15 | Null | 14 | 15 | Absolute | Insert 5 at 15 |
| 15 | Offset | 5 | 20 | Offset | Insert 5 at 15 |
| 24 | Absolute | [24 + 5] 29 | [24 + 5] 29 | Null | Delete 2 at 24 |
| [24 + 2] 26 | Offset | [5 − 2] 3 | [24 + 5] 29 | Offset | Delete 2 at 24 |

To end the example, Table 7 illustrates the replacement of five bytes at position 33.

TABLE 7

| Forward Sequence | Forward Operation | Value | Reverse Sequence | Reverse Operation | Modifications |
|---|---|---|---|---|---|
| 15 | Null | 14 | 15 | Absolute | Insert 5 at 15 |
| 15 | Offset | 5 | 20 | Offset | Insert 5 at 15 |
| 24 | Absolute | 29 | 29 | Null | Delete 2 at 24 |
| 26 | Offset | 3 | 29 | Offset | Delete 2 at 24 |
| 33 | Offset | 3 | [33 + 3] 36 | Offset | Replace 5 at 33 |
| [33 + 5] 38 | Offset | 3 | [38 + 3] 41 | Offset | Replace 5 at 33 |

When the first change point pair is added, the lowestForward and lowestReverse values are updated from the Forward and Reverse Sequence entries of the first change point in the pair.

Each time a pair of change points is added, the highestForward and highestReverse values are updated from the Forward and Reverse Sequence entries of the second change point in the pair.

As the TCP window moves to the right (due to Acknowledgements), it is possible to remove any change point pairs that fall completely to the left of the window. When a change point pair is removed, the initialOffset value is updated to the 'Value' of the second change point in the pair being removed. This ensures that segments being processed that fall before the first change point will have the correct sequence number offset applied. The lowestForward and lowestReverse values are also updated from the new first change point pair.

When a segment is ready for transmission, any modifications must be made before it is transmitted. The modification may have up to three independent parts namely:

a) Sequence Number Modification;
b) Data Modification; and
c) Acknowledgment Modification With regard to sequence number modification, modifications that affect a segment do not affect the sequence number of the segment itself. Only modifications that change previous segments affect the sequence number. For example, inserting bytes into a segment does not affect the sequence number of the segment, only sequence numbers within it. Thus, to find how a sequence number of a segment gets modified, we must look for the change point that occurs most recently before the segment. The change point found may also affect the segment, but it must start before it. The following pseudo-code illustrates the logic for modifying a sequence number.

```
seqLow         is the sequence number of the candidate segment
seqHigh        is the 'next' sequence number of the candidate
               segment (seqLow + data length)
newSeq         is the new sequence number for the segment
if seqHigh < lowestForward
    newSeq = seqLow + initialOffset
else if seqLow >= highestForward
    newSeq = seqLow + lastOffset
else
    previous = null
    for each changepoint-pair in the list of changepoint-pairs
        if changepoint1.forwardSequence >= seqLow
            if previous = null
                newSeq = seqLow + initialOffset
                break
            endif
            if previous2.forwardOperation = Offset
                newSeq = seqLow + previous2.Value
            else
                newSeq = previous2.Value
            endif
            break
        endif
        previous = changepoint
    endfor
endif
```

With regard to data modification, a segment will need to be modified if one or more change point pairs overlap with its range of sequence numbers. The sequence number modification already performed helps with finding the appropriate change points. If neither the lowestForward nor highestForward compares pass, then no modifications need to be performed on the segment. Otherwise, the value of changepoint can be used as a starting point for finding overlapping change points. A change point will affect a segment if the following is true:

(changepoint1.forwardSequence<seqHigh) AND
(changepoint2.forwardSequence>seqLow)

Once the set of affecting change points has been determined they can be applied to the segment. The physical modification of the segments will depend largely on the strategy being used to store and organize them. Some points to consider:

a) Modifications are relative to the original sequence number of the segment.
b) Changing the segment in place is preferable to creating a new one and copying.
c) All replacements can be done i) in place and ii) before other changes
d) Multiple deletes (only) can be performed in-place.
e) A single insertion (only) can be performed in-place (if there's sufficient space left in the fragment/MSS/MTU).
f) Fragmentation is a complicating factor. See discussion below.

With regard to acknowledgement modification, ACKS need to be updated if any modifications have been made to data transmissions in the other direction. Thus, updates to ACK numbers use the change point table that is created by the other 'side' of the connection. The process is very similar to sequence number modification:

```
Ack         is the candidate ACK number to be modified
if seqHigh < lowestReverse
    Ack = Ack - initialOffset
else if Ack >= highestReverse
    Ack = Ack - lastOffset
else
    previous = null
    for each changepoint-pair, in the list of change-point pairs
        if changepoint1.reverseSequence >= Ack
            if previous = null
                Ack = Ack - initialOffset
                break
            endif
            if previous2.reverseOperation = Offset
                Ack = Ack - previous2.Value
            else
                Ack = previous2.Value
            endif
            break
        endif
        previous = changepoint
    endfor
endif
```

The fragmentation of IP segments causes some care to be taken during the modification of TCP data in the manner described herein. RFC 879 discusses the details of fragmentation, the IP segment length and the TCP Maximum Segment Size (MSS) in detail. In general, the present invention does not receive TCP segments as multiple IP fragments; Path Maximum Transmission Unit (PMTU) discovery and careful choice of the MSS can be used to avoid it. Despite this, it is possible that fragmented TCP segments will be observed and they need to be handled correctly.

The MSS may well be discovered from the SYN handshake of TCP. If it is present, then this value can provide an upper bound for the maximum Transmission Unit (MTU). Internet Control Message Protocol (ICMP) messages being used to convey MTU information can also be used, if available, to pick the MTU. In the absence of this information, the size of segments and fragments can be analyzed to determine the 'highest seen' MTU. The resulting segments and fragments may not be as large as possible, but they are just as likely to be of an acceptable size as the originals. Alternatively the value of 536 bytes as specified in RFC 879 may be used.

After any modifications are performed, the following must hold, assuming they hold for the original segment:
a) Fragments must not be larger than the MTU;
b) Fragmentation must be performed on 8 byte boundaries; and
c) No TCP segment data can be larger than the MSS.

Also, since fragmentation in TCP is generally avoided, efforts should be taken not to introduce fragments into a segment that started out whole.

The decision on how a modification will affect a segment is requires comparing the size of the new segment to the original:

Equal: A benign operation has been performed. Any existing fragment boundaries can be kept.
Smaller: If there was no fragmentation, then all is fine. If fragmentation was present before the modification, then the fragment boundaries may need to be modified to adhere to the requirement for 8 byte boundaries as specified in RFC 791.
Larger: If the new segment size is larger than the MSS, then it must be split into multiple TCP segments. If the new segment size is larger than the MTU and the original segment wasn't fragmented, then it must be split into multiple TCP segments. If the original segment was fragmented, additional fragments may be created.

Figure 8:
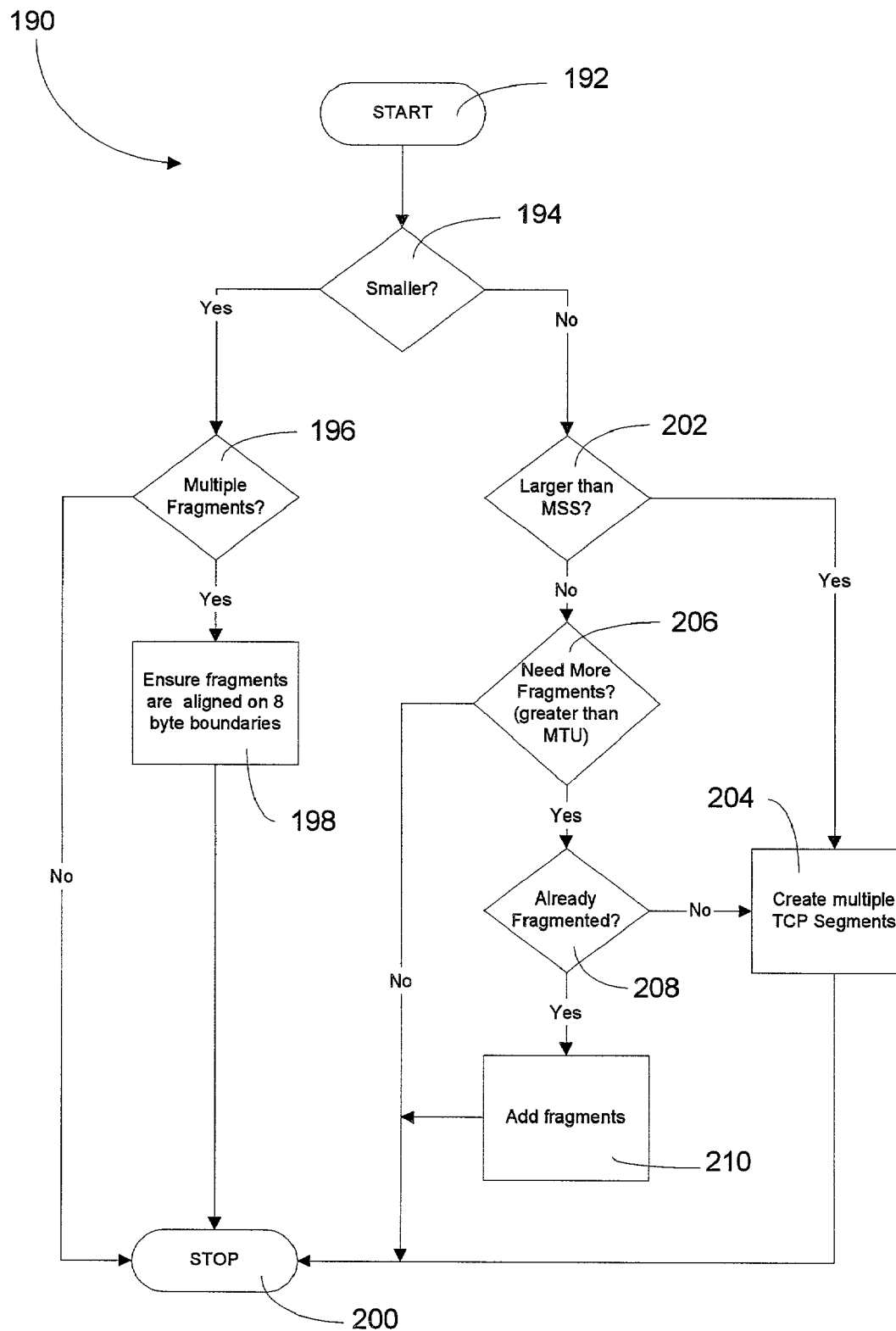
FIG. 8 is a flowchart of the process of fragmenting a segment.

Referring now to FIG. 8, a flowchart of process of fragmenting a segment is shown generally as 190. Process 190 begins at step 192 where control passes to step 194. At step 194 a test is made to determine if the modified segment is smaller than the original segment. If the test is true, then processing moves to step 196. At step 196 a test is made to determine if multiple fragments exist. If this is not the case, processing ends at step 200. If the test at step 196 is true than processing moves to module 198. Module 198 ensures that all fragment boundaries are modified so that each fragment is aligned on an eight byte boundary as required by RFC 791. Module 198 then passes control to step 200 and processing ends.

Returning to step 194, if the modified segment is not smaller than the original segment, processing moves to step 202. A test is made at step 202 to determine if the modified segment is larger than the maximum segment size. If this is the case, processing moves to step 204 where the modified segment is split into multiple TCP segments, each no larger than the estimate of the MTU. Processing then ends at step 200.

Returning to step 202, if the test is negative, processing moves to step 206 where a test is made to determine if the modified segment is greater than the maximum transmission unit. If it is not, processing ends at step 200. If the modified segment is greater than the MTU, processing moves to step 208. At step 208 a test is made to determine if the original segment was fragmented. If not, processing moves to step 204, which is discussed above. If the original segment was not fragmented processing moves to step 210 where additional fragments are created, each less than the value of the MTU. Step 210 then ends processing by moving to step 200.

In the description of FIG. 8, replacement operations are not considered as they do not affect the size of a segment.

Figure 9:
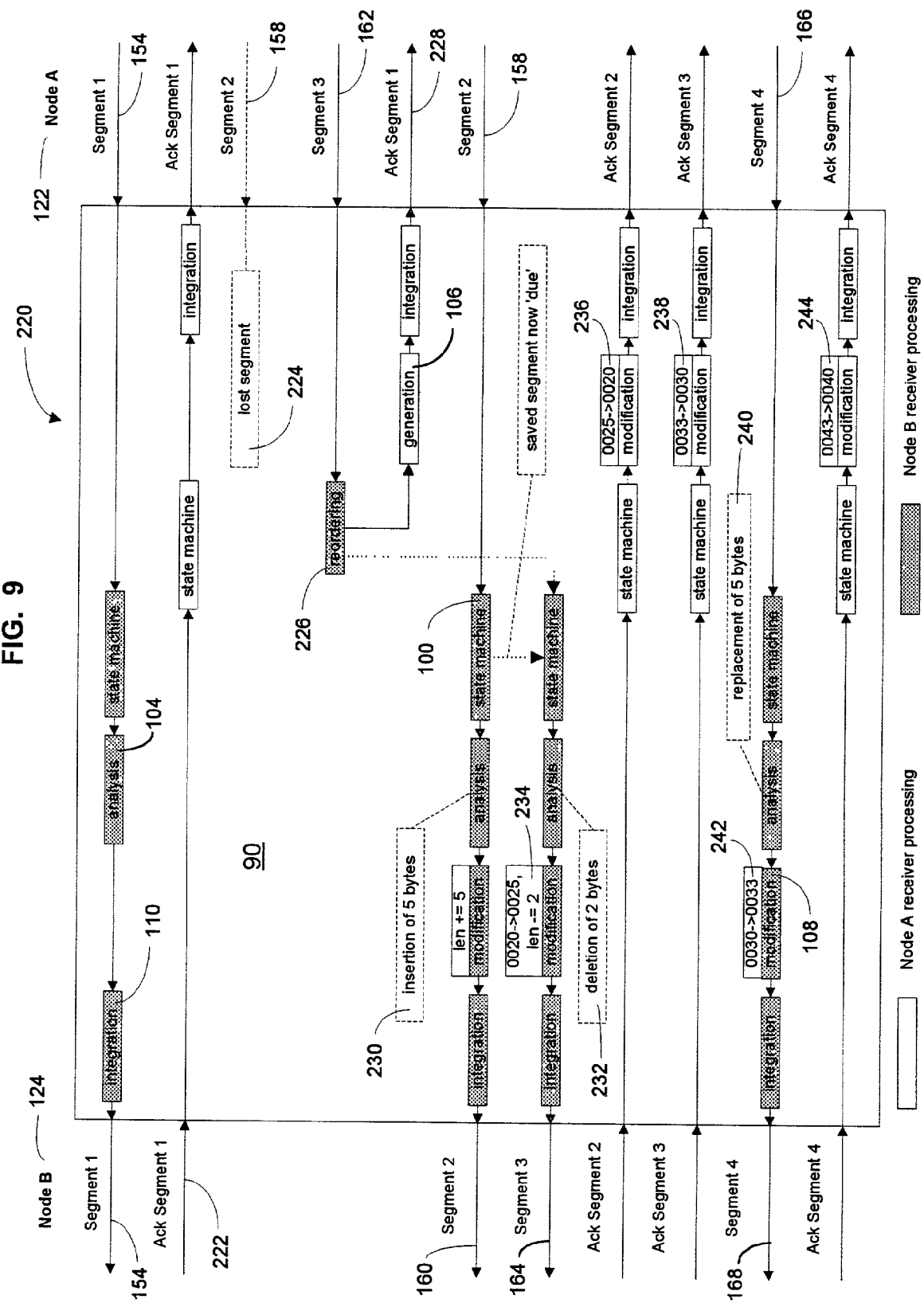
FIG. 9 is a block diagram of a segment flow example.

Referring now to FIG. 9, a block diagram of a segment flow example is shown generally as 220. Example 220 utilizes the same data stream example as described with reference to FIG. 6. Example 220 also incorporates the features of the present invention shown as TCP handler 90 (see FIG. 3). In FIG. 9, within TCP handler 90 only a single instance of each module 100, 104, 104, 108 and 110 has been provided with a feature number, in order to reduce clutter.

In example 220, Node A 122, performs all of the sending of data. Node B 124, acknowledges data but has no data of its own to send. As can be appreciated this is a simplistic example as both nodes 122 and 124 are TCP/IP hosts and as such may exchange data with each other. We will now refer to the actions of Node A 122 as shown from top to bottom on the right hand side of FIG. 9 and how they interact with the actions of Node B 124 on the left hand side of FIG. 9.

Node A 122 sends first segment 154 to Node B 124. As discussed above, first segment 154 is not modified by application layer analysis 104 and thus a simple acknowledgement 222 is provided by Node B 124 to Node A 122 for first segment 154.

Node A 122 attempts to send second segment 158, but it is lost by network error as shown by feature 224. When Node A 122 sends third segment 162, reordering component 226 recognizes that the third segment has been received out of order, and stores the third segment. Segment generation module 106 is then invoked to send an acknowledgement of the first segment shown as feature 228. This acknowledgement facilitates a fast retransmit of the second segment. This acknowledgement could also include a SACK option to indicate that the first and third segments have been received.

When TCP handler 90 receives second segment 158, both second segment 158 and third segment 162 are processed in the intended order. As shown at 230 five bytes are inserted into second segment 158 by application layer analysis module 104. Modification module 108 makes the appropriate changes to second segment 158 and a modified second segment 160 is passed to Node B 124. TCP handler 90 next processes third segment 162 which has been modified by the deletion of two bytes as shown by feature 232. The original third segment 162 would have started at byte position 20, however the addition of five bytes to second segment 158 requires modification module 108 to increase the sequence number from twenty to twenty-five as shown at 234. The modified second segment 160 is acknowledged with the sequence number known to Node B 124 and is mapped to that known to Node A 122 at feature 236. The same step is performed at 238 for the modified third segment 164. Node A 122 transmits fourth segment 166, which is modified to replace five bytes as shown at 240. The appropriate mapping to indicate an overall addition of three bytes to the data stream containing the fourth segment is shown at 242, and the modified fourth segment 168 is forwarded to Node B 124. The reverse mapping for the acknowledgement of modified fourth segment 168 is shown at 244.

Figure 10:
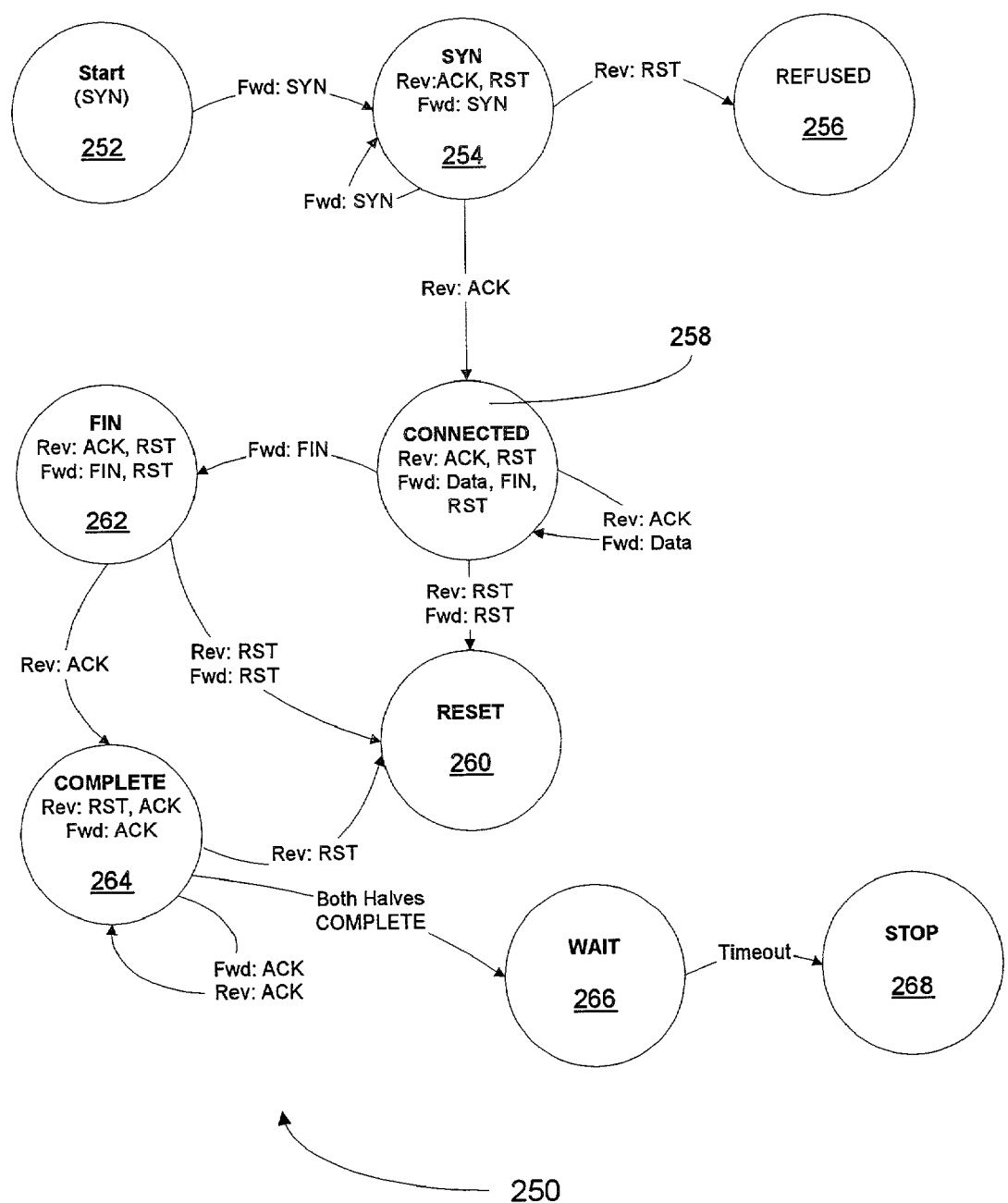
FIG. 10, is a state diagram of the states encountered during the lifetime of a connection.

Referring now to FIG. 10, a state diagram of the states encountered during the lifetime of a connection is shown generally as connection state machine 250. Connection state machine 250 is instantiated by state retrieval module 98 (see FIG. 3), when a new connection is identified. State machine 250 is an instance of state machine 100 of FIG. 3, and is maintained for each half of a connection.

Upon receipt of the first SYN packet, two state machines 250 are instantiated, one for each half of the connection. One machine 250 is placed in start state 252 and the other in SYN state 254. The term "Fwd" in FIG. 10 refers to a flag or data that has been received by state machine 250, i.e. a segment in the forward direction. The term "Rev" refers to an RST or ACK received in the reverse direction. Once in state 254, machine 250 may receive an RST flag, which places the machine in state 256, where the request for connection is refused and state machine 250 may be deleted or reallocated to another connection.

If a connection is accepted, by receipt of an ACK flag, state machine 250 moves to connected state 258. Once in state 258, machine 250 may receive data. Should either side of the connection request an RST then machine 250 moves to state 260 at which state machine 250 may be deleted or reallocated to another connection.

If state 258 determines there is no more data from the other side of the connection i.e. it has received a segment containing a FIN flag, then machine 250 moves to state 262. State 262 will continue to forward retransmitted data, as well as SEQN and FIN flags. Once a FIN has been received, no storing or reordering of segments takes place. This is due to the fact that after receipt of the FIN flag, all data will have been seen by the application layer 104 (FIG. 3) and all modification tags will have been created. The entry to the finished state 262 ensures that any final retransmissions of data are handled correctly.

If at state 262 either side of the connection provides an RST than machine 250 moves to state 260 at which state machine 250 may be deleted or reallocated to another connection.

If at state 262, an ACK is received from the other side of the connection, state machine 250 moves to state 264. In state 264 if a RST is received than machine 250 moves to state 260. In state 264 machine 250 will continue to receive ACKs and forward them to the appropriate connection. Once both sides of the connection have reached state 264, state machine 250 moves to state 266. At state 266, machine 250 continues to forward any data or SEQN that may arrive and after a timeout period moves to state 268 where the state machines on both sides of the connection are deleted or reallocated.

Figure 11:
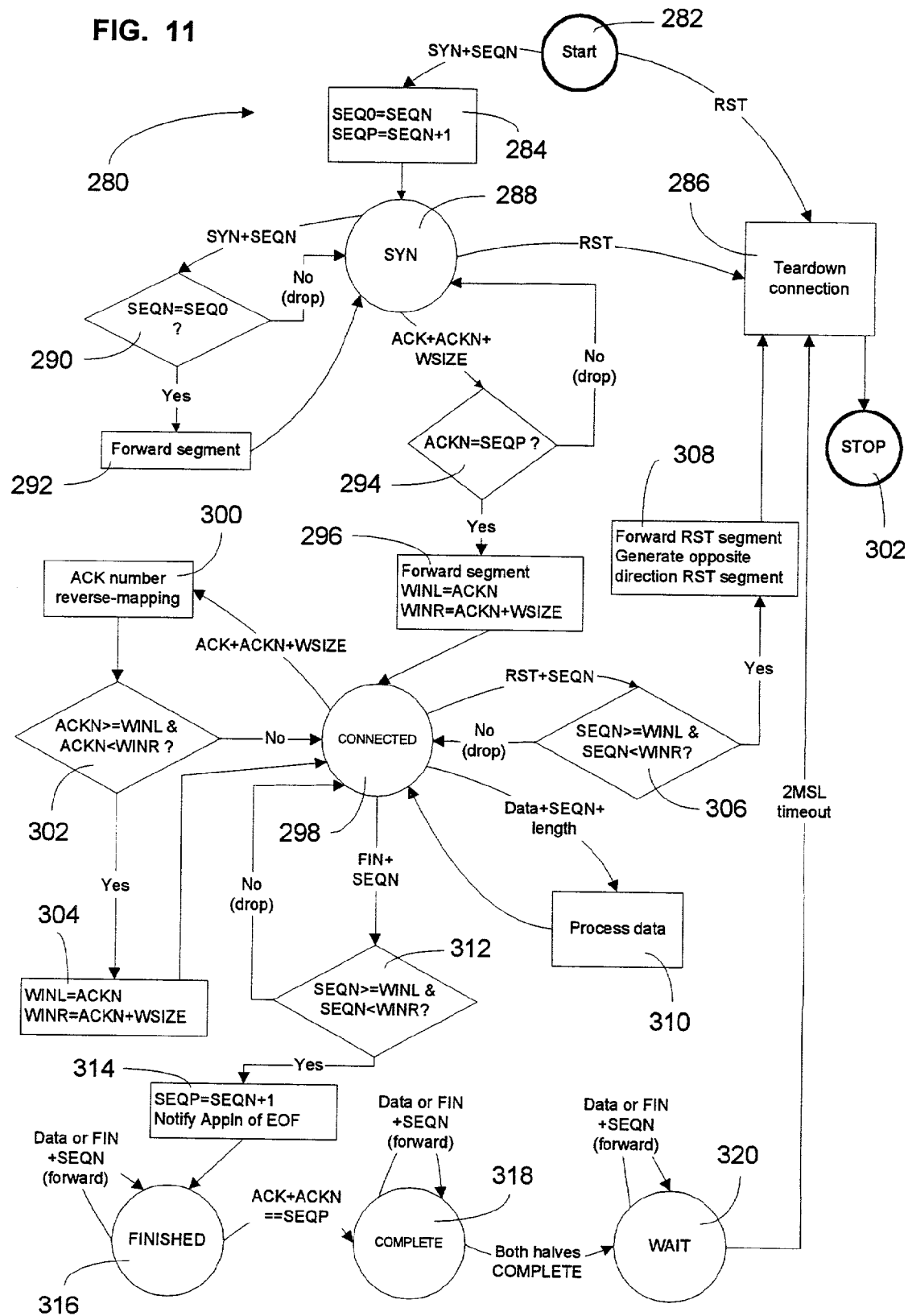
FIG. 11 is a logical flow diagram of a state machine.

Referring now to FIG. 11 a logical flow diagram of a state machine is shown generally as 280. Machine 280 is an alternate representation of state machine 250 of FIG. 10. The following Table 7 will aid the reader in understanding the terms utilized in FIG. 11.

TABLE 8

| Term | Description |
| --- | --- |
| SYN | Synchronize sequence number |
| SEQN | Sequence number |
| Data | Data |
| length | Length of data |
| FIN | No more data from the sender |
| ACK | Acknowledgement |
| ACKN | Acknowledgement number |
| WSIZE | TCP window size (of a receiver) |
| RST | Reset the connection |
| SEQP | Next uninspected SEQN |
| WINL | Left edge of TCP window |
| WINR | Right edge of TCP window |
| SACK | Selective Acknowledgement |
| WSCALE | Window scale option. |

The inputs to machine 280 in a forward direction are:
a) SYN+SEQN;
b) data+SEQN+length; and
c) FIN+SEQN;
The inputs to machine 280 in a reverse direction are:
a) ACK+ACKN+WSIZE; and
b) RST+SEQN The variables for machine 280 are: SEQP, WINL and WINR.

Figure 5:
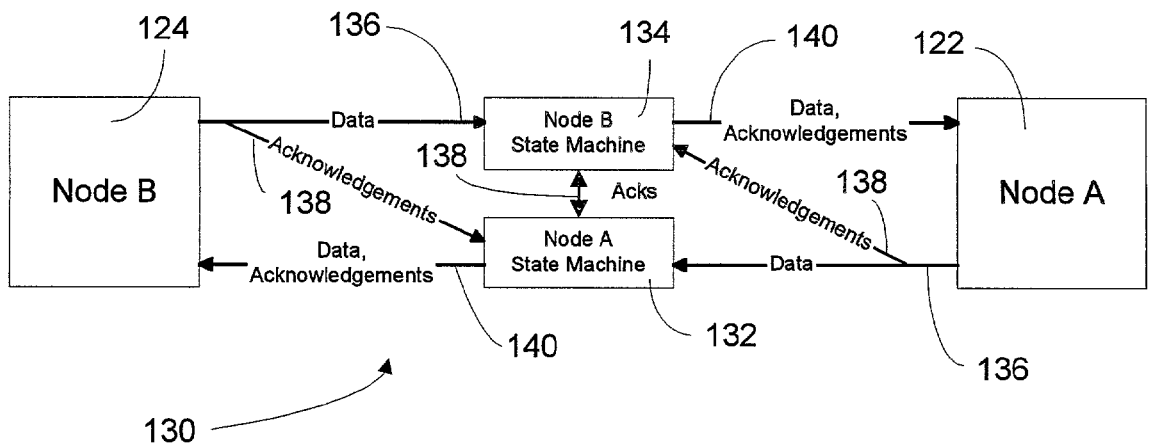
FIG. 5 is a block diagram illustrating the direction of communications between two state machines.

A state machine 280 is instantiated by state retrieval module 98 (see FIG. 3). State machine 280 is an instance of state machine 100 of FIG. 3 and two machines 280 are created, one for each side of the connection as shown in FIG. 5.

Upon creation, state machine 280 is placed in a start state 282. Should state machine 280 receive a SYN flag and an accompanying sequence number SEQN, processing moves to module 284. Should an RST flag be received by state 282 then processing moves to module 286 where the connection to state machine 280 is dropped. Module 284 may also receive a SACK—permitted option to enable the use of SACK. Module 284 may also receive a WSCALE value, indicating the scale factor applied to window size fields.

At module 284 the value SEQ0 is set to the value of SEQN. The value of SEQP is then set to SEQN+1, i.e. the next uninspected sequence number. State machine 280 then moves to state 288. At state 288 should a SYN+SEQN combination be received, a test for equality is made at step 290 between the newly received SEQN and the value of SEQ0 set at step 284. If the test is negative the segment containing the SYN+SEQN combination is dropped and control returns to state 288. If the test is positive, the segment is forwarded by module 292. By "forwarded" we mean that the segment is forwarded to the node on the opposite side of the connection to the node that sent the segment. State machine 280 then returns to state 288.

Should state 288 receive a segment containing the sequence ACK+ACKN+WSIZE, a test is made at step 294 to determine if the value of ACKN is equal to that of SEQP, if it is, then processing moves to step 296. The movement to step 296 indicates that a "handshake" has been established for the connection. At step 296 the segment is forwarded. The value of WINL is set to ACKN and the value of WINR is set to ACKN+WSIZE. Machine 280 then moves to connected state 298. If the test at step 294 fails, then the segment is dropped and machine 280 returns to state 288.

Once in state 298 if a segment is received containing the sequence ACK+ACKN+WSIZE then module 300 is invoked for reverse mapping of ACK numbers. A test is made at step 302 to determine if the value of ACKN is within the TCP window. If it is not, the segment is forwarded and machine 280 remains in connected state 298. If the value of ACKN is within the TCP window, control moves to step 304 where WINL is set to the value of ACKN and WINR is set to the value of ACKN+WSIZE, the ACK portion of the segment is forwarded, and machine 280 remains in connected state 298.

If state 298 receives the sequence RST+SEQN a test is made at step 306 to determine if the value of SEQN is within the TCP window, if it is, control moves to step 308 where the RST segment is forwarded and an opposite direction RST segment is generated. Control next moves to step 286 where the connection is dropped. If at step 306 the value of SEQN is not within the TCP window, the segment is dropped.

Figure 12A:
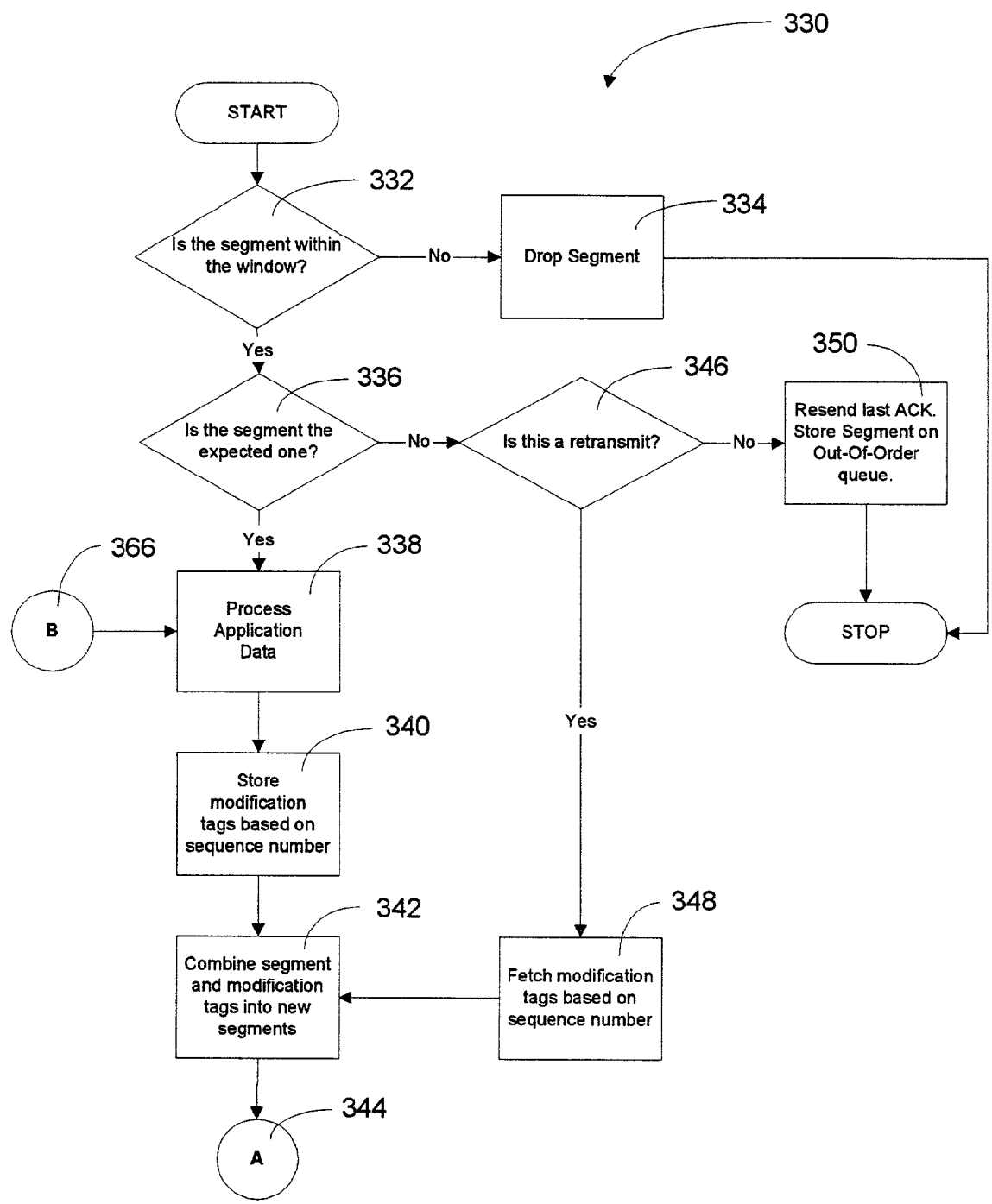
FIGS. 12a and 12b are a flowchart of data processed in a connected state.
Figure 12B:
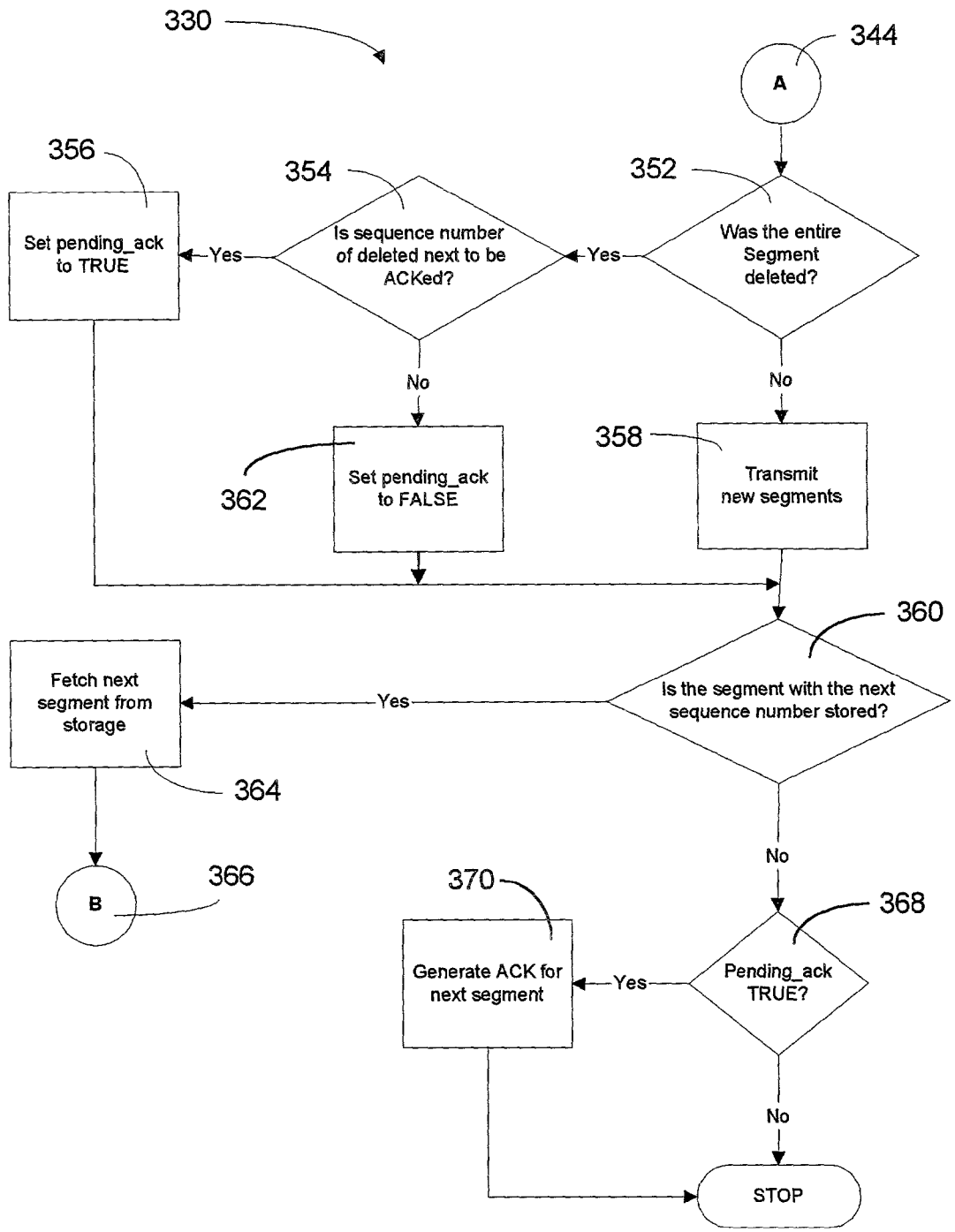
Figure 13:
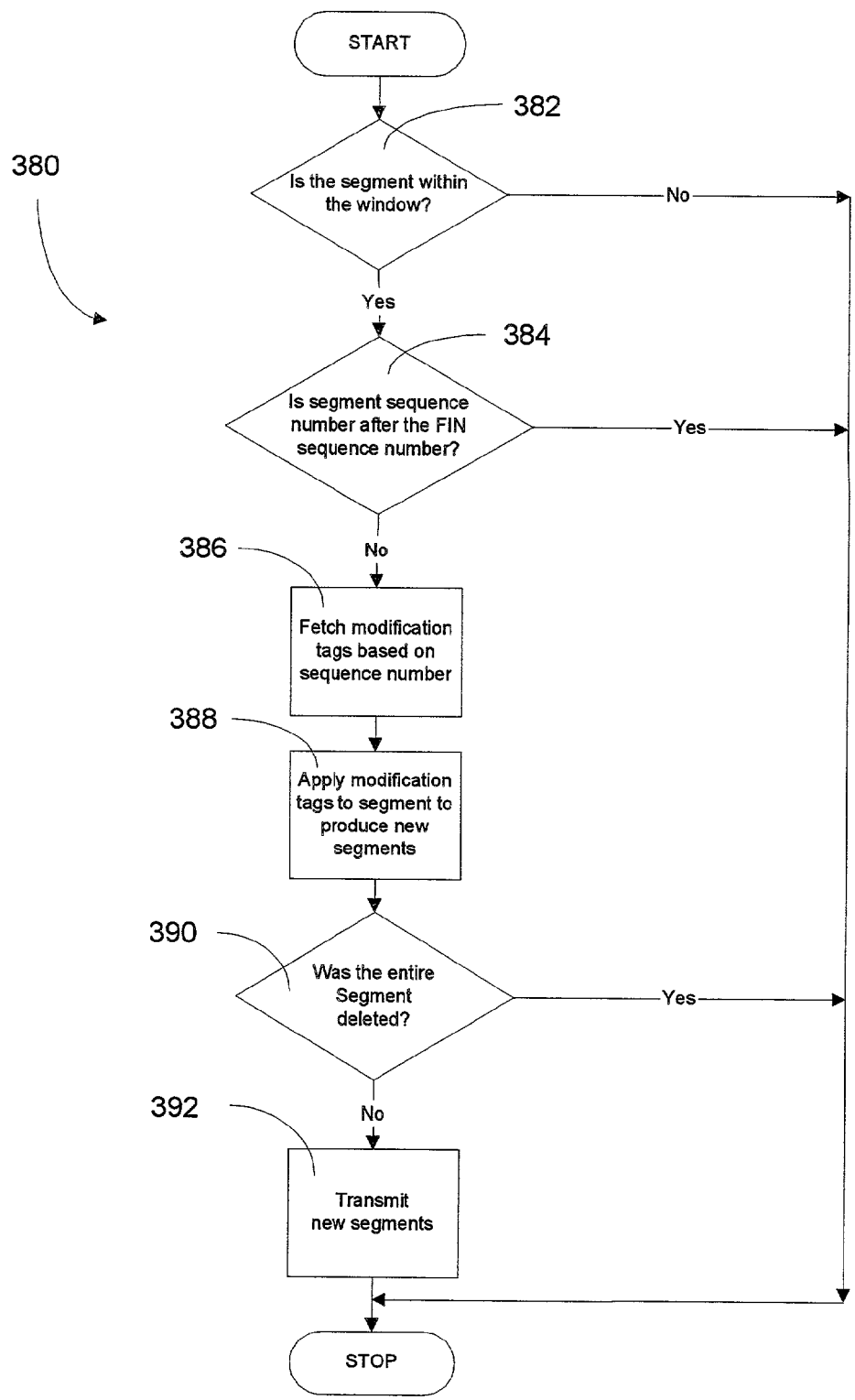
FIG. 13 is a flowchart of FIN, SEQN and data processing.

If state 298 receives a segment containing data, SEQN and a length, the data is processed at step 310 (see FIGS. 12a and 12b). Also, if a segment containing data and a FIN flag is received at state 298 then step 310 is performed prior to the test at step 312. If a segment containing the sequence FIN+SEQN is received by state 298, then a test is made at step 312 to determine if the value of SEQN is within the TCP window. If it is not, the segment is dropped. If it is within the window, processing moves to step 314 where SEQP is set to the value of SEQN+1 and the application is notified of EOF. State machine 280 then enters finished state 316, where it will continue to forward retransmitted data, as well as SEQN and FIN flags. Once a FIN has been received, no storing or reordering of segments takes place. This is due to the fact that after receipt of the FIN, all data will have been seen by the application layer 104 (FIG. 3) and all modification tags will have been created. The entry to the finished state 316 ensures that any final retransmissions of data are handled correctly. The processing of FIN, SEQN and data in state 316 is shown in FIG. 13. Once an ACK has been received and the value of ACKN equals that of SEQP then state machine 280 moves to complete state 318. State 318 accepts and forwards retransmitted data and FIN flags. The processing of FIN, SEQN and data in state 318 is shown in FIG. 13. Once both halves of the connection are in complete state 318 they move to wait state 320. The processing of FIN, SEQN and data in state 320 is shown in FIG. 13. After a time of 2MSL (a configurable parameter) the connection is ended at step 286.

Although not shown in FIG. 11, state 298 may also receive an urgent segment. If the URG flag is set in a TCP header, then the 16-bit urgent pointer field of the TCP header may require modification. The meaning of the urgent pointer is that it should be added to the sequence number of the TCP header to obtain the sequence number of the location of the end "urgent" data (by application-layer definition). Because the use of urgent data is application specific, the urgent data is forwarded to application layer analysis module 104 (FIG. 3). Module 104 can add or delete the URG flag. Modification module 108 will correctly adjust the urgent pointer if data is inserted or deleted before the offset of the urgent data.

In FIGS. 12a and 12b, a flowchart of data processed in the connected state is shown generally as 330. This flowchart describes the functionality of module 310 of FIG. 11. Referring first to FIG. 12a, when a segment is received, a test is made at step 332 to determine if the segment is within the TCP window. If the segment is not within the window, the data portion of the segment is dropped at step 334 and processing stops. If the segment is within the window, processing moves to step 336 where a test is made to determine if the segment contains the expected data. This test is:

(SEQP>=SEQN) and (SEQP<SEQN+length)

If it is an expected segment, processing moves to step 338 where the appropriate application handler processes the data, beginning at SEQP. At step 340 modification tags are stored indexed by sequence number. At step 342 the segment is combined with the modification tags to create new segments. Processing then moves to FIG. 12b as indicated by transfer point 344.

Returning to step 336, if the segment is not the expected one, processing moves to step 346 where a test is made to determine if this is a retransmitted segment. If it is, processing moves to step 348 where the modification tags for the segment are fetched based upon the value of SEQN to SEQN+length for the segment. Processing then moves onto step 342 as described above. If at step 346 the segment is determined not to be a retransmission, processing moves to step 340 where the last ACK is resent, with an optionally added SACK, and the segment is stored in a out of order queue and processing ends. The last ACK is resent as receipts of several ACKs of the same sequence number indicate dropped data. An out of order segment cannot be forwarded until examined by an application handler, as the segment might be modified. A limit may also be placed on the number of out of order packets that can be stored to prevent Denial of Service (DoS) attacks. Once the limit has been reached, packets with the largest SEQN will be dropped.

Referring now to FIG. 12b, step 342 of FIG. 12a has passed control to step 352 as shown by transfer point 344. At step 352 a test is made to determine if the entire segment was deleted. If it was, control moves to step 354 where a test is made to determine if the sequence number of the deleted segment is the next segment to be acknowledged. If the test at step 354 is true, processing moves to step 356 where the variable pending_ack is set to true. Processing then moves to step 360. If the test at step 354 is false then processing moves to step 362 where the variable pending_ack is set to false, and processing moves to step 360. Returning to step 352 if the entire segment was not deleted, the new segments are transmitted at step 358 and processing moves to step 360. A test is made as step 360 to determine if the segment with the next sequence number is stored. If the segment is stored, control moves to step 364 where the next segment is fetched from storage.

Step 364 also considers the TCP timestamp options as defined in RFC 1323. State machine 100 maintains a variable TS.Recent for each connection as described in RFC 1323. Upon receipt of segments containing timestamp options, the timestamp will be validated against TS.Recent and possibly discarded as described in RFC 1323. As the present invention store out of order segments, the timestamp mechanism will not function unless reordered segments are given a new timestamp. When retransmitted, such segments will be stamped with the time value of TS. Recent for the connection.

Step 364 then moves to step 338 of FIG. 12a as indicated by transfer point 366. If the test at step 360 returns a false value then processing moves to step 368 where a test is made to determine if the value of pending_ack is true. If it is not, processing ends at step 372. If the value of pending_ack is true, processing moves to step 370 where an ACK is generated for the next expected segment and processing ends at step 372.

Referring now to FIG. 13 a flowchart of FIN, SEQN and data processing is shown generally as 380. FIG. 13 illustrates the process applied by states 316, 318 and 320 of FIG. 11 when handling Data+SEQN or FIN+SEQN state changes. Beginning at step 382 a test is made to determine if the segment received is within the TCP window, if it is not the segment is dropped and processing ends. If the segment is within the TCP window, processing moves to step 384. At step 384 a test is made to determine if the segment sequence number is after the FIN sequence number. The FIN sequence number is the sequence number of the FIN flag, which caused the transition, finished state 316. If the test is true, the segment is dropped and processing ends. If the test is false, processing moves to step 386. At step 386 where the modification tags for the segment are fetched based upon the value of SEQN to SEQN+Length for the segment. Processing next moves to step 388 where the segment is combined with the modification tags to produce new segments. Processing then moves to step 390 where a test is made to determine if the entire segment has been deleted. If this is the case then the segment is dropped and processing ends. If not, processing moves to step 392 where the new segments are transmitted and processing ends.

As can be seen with the above descriptions of FIGS. 11, 12a, 12b, and 13 each state machine 280 maintains the following information:
a) a queue of out of order segments;
b) the next expected sequence number;
c) the highest acknowledged sequence number;
d) the FIN sequence number; and
e) the window right edge calculated from ACKN plus the window size including scaling if the WSCALE option is present.

Figure 14:
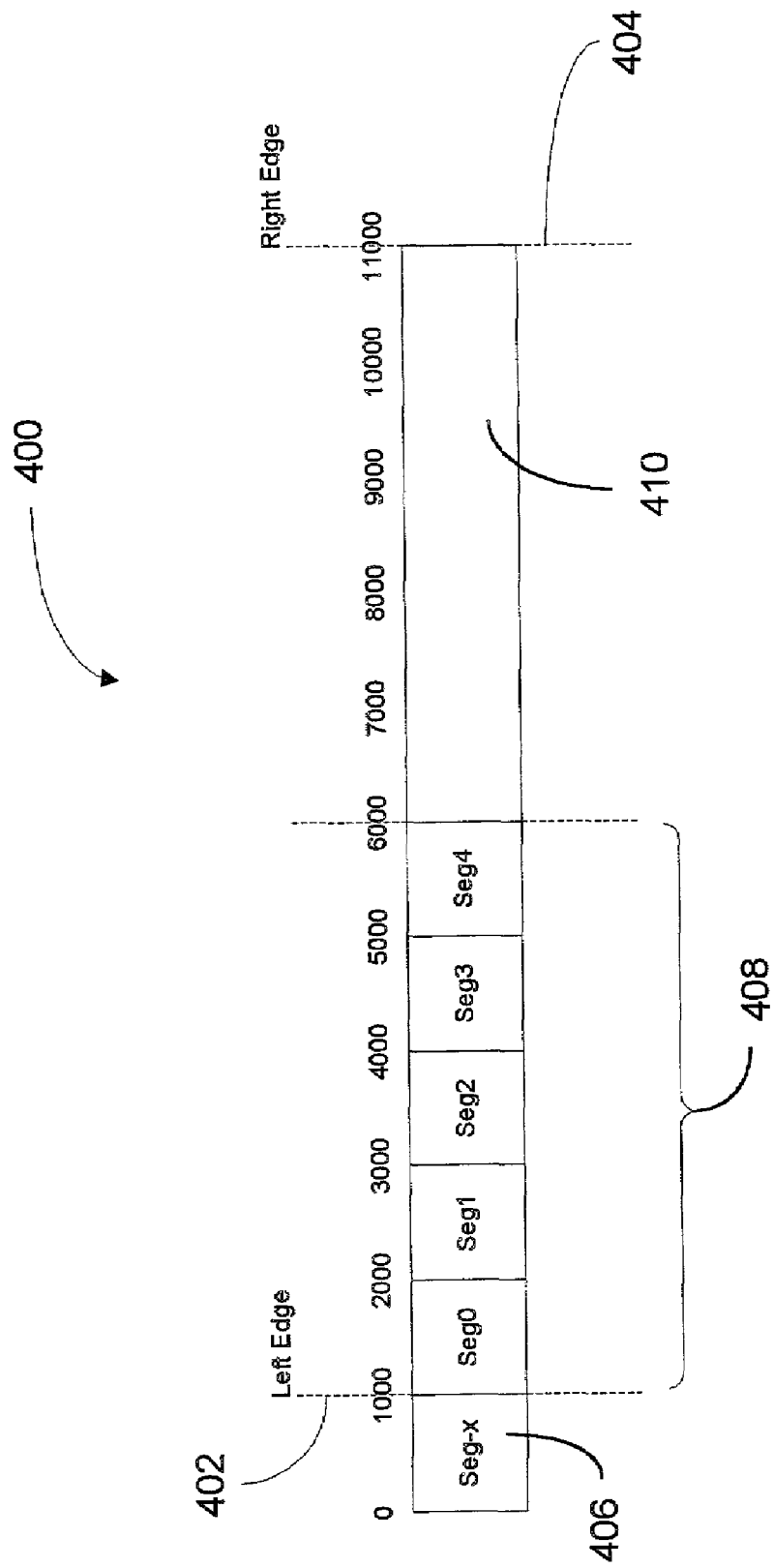
FIG. 14 is a block diagram of a TCP window.

Throughout the above description, we have referred to a TCP Window. FIG. 14 is a block diagram of a TCP window shown generally as 400. TCP window 400 has a left edge 402 and a right edge 404. In FIG. 14, window 400 is shown from the perspective of a proxy, i.e. what the proxy perceives as the receiver's window. The data portion of each segment is 1000 bytes in length. Feature 406 indicates a segment that has been acknowledged by the receiver and can be discarded if sent again. Feature 408 indicates a range of five segments that have been transmitted but not yet acknowledged by the recipient, thus they remain in the window. Feature 410 indicates the space that the receiver claims to have left in the receiver buffer.

Each state machine 100 (see FIG. 3) monitors the segments it sends and monitors the acknowledgements coming from the other side of the connection. In the example of FIG. 14, state machine 100 may discard any data corresponding to sequence numbers of less than 1000 or greater than 11000, this is subject to two special cases:
1) TCP keep_alive probes; and
2) window probes.

In the case of TCP keep_alive probes; after a long idle time, for example two hours of no segments sent or received, either node may optionally probe the state of the other by sending a keep_alive probe. A keep_alive probe is a segment having a sequence number one less than the next sequence number to be sent and having no data or one random byte of data. Although the sequence number will be to the left of the window, the segment is passed through the proxy unmodified. To confirm that it is still alive, the receive of a keep_alive probe will resend its previous ACK.

In the case of window probes; after a receive has acknowledged data and explicitly indicated a window size of zero, the sender will periodically send a segment containing one byte past the right edge of the window to determine if the window size has been increased. The receiver will either acknowledge the new byte or resend the previous zero window size acknowledgement.

If a segment arrives that is not within window 400, the sequence numbers and ACK numbers are treated independently. If either one is within the TCP window, the segment is not dropped. Valid data segments that have invalid ACK numbers will have the data processed correctly, and valid ACK numbers with invalid data sequence numbers will update the window correctly. ACK numbers that fall to the left of window 400 are promoted to the left edge 402. ACK numbers within range 408 are used to update left edge 402. ACK numbers to the right of range 408 are invalid and are replaced with that of left edge 402. Segments that contain sequence numbers that are outside of window 400 are dropped as they have either already been acknowledged are they are too far in the future. Segments within window 400 are either: retransmitted segments, current segments or an out of order segment. Retransmitted segments may have previously calculated modifications that need to be handled. Current segments are processed by application layer analysis module 104. In the case of an out of order segment, i.e. the sequence number is in the window, but does not match what is expected, then it is saved in a reorder queue, and the most recent reverse direction ACK re-issued, optionally with a SACK indicating the segments received. If the segment was lost, then the ACK will help it to be retransmitted, if it was out-of-order then no harm is done.

Correct segments that contain data are sent to application layer analysis 104 (see FIG. 3) for stream based analysis. These segments are sent by the state machine in the correct sequence without holes or duplications. Under most circumstances, the segments come back exactly as sent and no further processing is needed. In cases, such as certain types of content filtering, the segments will require modification. The modifications to be made are returned by an application handler in the form of modification tags along with the original segment. The actual modifications are not performed by either an application handler or state-machine 100 as the modifications may have to be reapplied upon retransmission of segments. Modification module 108 actually performs the modifications to segments.

Depending upon where a segment is in relation to the current window determines how it will be handled. For example:

a) if a segment is completely before left edge 402 it will be discarded unless it is a keep_alive segment;

b) if a segment contains some data to the left of edge 402 and other data within the window, the data to the left will be discarded and the data to the right will be reprocessed as retransmitted data;

c) if a segment contains entirely retransmitted data, it will be reprocessed;

d) if a segment of example b) further includes new data, the new data will be processed;

e) if a segment contains retransmitted data and new data, the retransmitted data will be reprocessed and the new data will be processed;

f) if the segment is between left and right edges, but out of order, it will be saved for later processing; and g) any segment partially or completely in the future will be dropped, unless it is a window probe segment.

Although the description of the present invention provides a TCP proxy, it is not the intent of the inventors to restrict the invention solely to a network utilizing TCP only. Any network that provides protocol layers that ultimately result in the use of TCP may make use of the present invention, for example TCP over UDP.

Although the present invention has been described as being implemented in software, one skilled in the art will recognize that it may be implemented in hardware as well. Further, it is the intent of the inventors to include computer readable forms of the invention. Computer readable forms meaning any stored format that may be read by a computing device.

Although the invention has been described with reference to certain specific embodiments, various modifications thereof will be apparent to those skilled in the art without departing from the spirit and scope of the invention as outlined in the claims appended hereto.

We claim:

1. A method for modifying a bi-directional stream of TCP segments between two nodes, said method comprising:
   providing a state machine configured to:
      identify data within said TCP segments, and
      create a properly reconstructed stream of TCP segments,
   providing an application layer analysis module configured to:
      receive said reconstructed stream of TCP segments from the state machine,
      examine said reconstructed stream of TCP segments, and
      create TCP segment modification tags;
      wherein said modification tags represent associations between TCP sequence numbers and TCP segment modifications;
   providing a modification module configured to:
      accept said TCP segment modification tags, and
      create modifications to at least a portion of said TCP segments on a segment by segment basis, based on said modification tags.

2. The method of claim 1 further comprising the step of utilizing a segment generation module for the purpose of determining if a modified TCP segment needs to be fragmented and if so generating new TCP segments and forwarding them to said modification module.

3. The method of claim 1 wherein said modifications to said TCP segments comprises insertion of data into a TCP segment.

4. The method of claim 1 wherein said modifications to said TCP segments comprises deletion of data in a TCP segment.

5. The method of claim 1 wherein said modifications to said TCP segments comprises replacement of data in a TCP segment.

6. The method of claim 1 further comprising the step of utilizing a state retrieval module, said state retrieval module associating a TCP segment with a state machine for each distinct TCP connection between nodes.

7. The method of claim 6 further comprising the step of utilizing a validation module, said validation module screening TCP segments for validity before passing them to said state retrieval module.

8. The method of claim 1 further comprising the step of determining if a TCP segment is an out of order TCP segment and if so, saving said out of order TCP segment and sending an acknowledgement for the last in-order TCP segment.

9. The method of claim 1 further comprising the step of determining if a TCP segment is a deleted TCP segment, based upon said modification tags and if so, generating an acknowledgement for said deleted TCP segment.

10. The method of claim 1 further comprising the step of recording each of said TCP segment modification tags as change points, for the purpose of mapping sequence numbers to modified sequence numbers and vice versa, said change points comprising:
   a) a forward sequence number;
   b) a forward operation;
   c) a value;
   d) a reverse sequence number;
   e) a reverse operation; and
   f) a linkto any modified data.

11. The method of claim 1 further comprising the step of managing said TCP segments in a TCP window by determining if a portion of a TCP segment is within said TCP window and applying applicable modification tags to said TCP segment.

12. The method of claim 11 further comprising the step that if a TCP segment is entirely to the left of said TCP window, dropping said TCP segment.

13. The method of claim 11 further comprising the step that if a TCP segment is entirely to the right of said TCP window, dropping said TCP segment.

14. The method of claim 1 further comprising the step of applying said TCP segment modification tags to retransmitted TCP segments.

15. A system for modifying a bi-directional stream of TCP segments between two nodes, said system comprising:
   a state machine configured to:
      identify data within TCP segments, and
      create a properly reconstructed stream of TCP segments;
   an application layer analysis module configured to:
      receive said properly reconstructed stream of TCP segments from said state machine,
      examine said TCP segments, and
      create modification tags, said modification tags representing associations between TCP sequence numbers and TCP segment modifications;
   a modification module configured to:
      receive said modification tags from said application layer analysis module, and
      create modifications to at least a portion of said TCP segments on a segment by segment basis, based on said modification tags.

16. The system of claim 15 further comprising a segment generation module able to determine if a modified TCP segment needs to be fragmented and means for generating new TCP segments and forwarding them to said modification module.

17. The system of claim 15 wherein said modification module further comprises means for inserting data into a TCP segment.

18. The system of claim 15 wherein said modification module further comprises means for deleting data in a TCP segment.

19. The system of claim 15 wherein said modification module further comprises means for replacing data in a TCP segment.

20. The system of claim 15 further comprising a state retrieval module, said state retrieval module able to associate a TCP segment with a state machine for each distinct TCP connection between nodes.

21. The system of claim 20 further comprising a validation module said validation module able to screen TCP segments for validity and means for passing TCP segments to said state retrieval module.

22. The system of claim 15 further comprising means for determining whether a TCP segment is an out of order TCP segment and means for saving said out of order TCP segment and sending an acknowledgement for the last in-order TCP segment.

23. The system of claim 15 further comprising means for determining if a TCP segment is a deleted TCP segment, based upon said modification tags and means for generating an acknowledgement for said deleted TCP segment.

24. The system of claim 15 further comprising means for recording each of said TCP segment modification tags as change points, for the purpose of mapping sequence numbers to modified sequence numbers and vice versa, said change points comprising:
   a) a forward sequence number;
   b) a forward operation;
   c) a value;
   d) a reverse sequence number;
   e) a reverse operation; and
   f) a link to any modified data.

25. The system of claim 15 further comprising means for managing said TCP segments in a TCP window, means for determining if a portion of a TCP segment is within said TCP window and means for applying applicable modification tags to said TCP segment.

26. The system of claim 25 further comprising means for dropping a TCP segment that is entirely to the left of said TCP window.

27. The system of claim 25 further comprising means for dropping a TCP segment that is entirely to the right of said TCP window.

28. A system according to claim 15 said system further comprising means of applying said modification tags to retransmitted TCP segments.

29. A physical computer readable medium including computer executable instructions which, when executed on a computing device, cause the computing device to:
   provide a state machine, said state machine configured to:
      identify data within TCP segments, and
      create a properly reconstructed stream of TCP segments;
   provide an application layer analysis module configured to:
      receive said reconstructed stream of TCP segments from the state machine,
      examine said reconstructed stream of TCP segments, and
      create TCP segment modification tags, said modification tags representing associations between TCP sequence numbers and TCP segment modifications;
   provide a modification module configured to:
      accept said TCP segment modification tags, and
      create modifications to at least a portion of said TCP segments on a segment by segment basis, based on said modification tags.

30. A computer readable medium according to claim 29 further comprising applying said TCP segment modification tags to retransmitted TCP segments.

* * * * *